United States Patent
Weiss et al.

(10) Patent No.: US 10,995,961 B2
(45) Date of Patent: May 4, 2021

(54) FITOUT ARTICLES AND ARTICLES OF EQUIPMENT FOR KITCHENS OR LABORATORIES WITH A LIGHTING ELEMENT

(71) Applicant: SCHOTT AG, Mainz (DE)

(72) Inventors: Evelin Weiss, Mainz (DE); Matthias Bockmeyer, Mainz (DE); Birgit Dörk, Mainz (DE); Friedrich Siebers, Nierstein (DE); Christian Henn, Frei-Laubersheim (DE)

(73) Assignee: SCHOTT AG, Mainz (DE)

( * ) Notice: Subject to any disclaimer, the term of this patent is extended or adjusted under 35 U.S.C. 154(b) by 103 days.

(21) Appl. No.: 16/228,901

(22) Filed: Dec. 21, 2018

(65) Prior Publication Data

US 2019/0195510 A1 Jun. 27, 2019

(30) Foreign Application Priority Data

Dec. 22, 2017 (DE) .................. 10 2017 131 113
May 7, 2018 (DE) .................. 10 2018 110 910

(51) Int. Cl.
*F24C 7/00* (2006.01)
*F24C 15/10* (2006.01)
(Continued)

(52) U.S. Cl.
CPC .............. *F24C 15/10* (2013.01); *C03C 3/087* (2013.01); *C03C 3/097* (2013.01); *C03C 4/02* (2013.01);
(Continued)

(58) Field of Classification Search
CPC ........ F24C 15/10; F24C 15/102; F24C 7/082; F24C 7/083; F21W 2131/307
See application file for complete search history.

(56) References Cited

U.S. PATENT DOCUMENTS 3,756,798 A 9/1973 Emsberger
3,788,865 A 1/1974 Babcock
(Continued)

FOREIGN PATENT DOCUMENTS

CN 1326903 12/2001
CN 1332127 1/2002
(Continued)

OTHER PUBLICATIONS

DIN ISO 7884-8, "Glass—Viscosity and viscometric fixed points—Part 8: Determination of (dilatometric) transformation temperature", Feb. 1998 (formerly DIN 52324).
(Continued)

*Primary Examiner* — Andrew J Coughlin
(74) *Attorney, Agent, or Firm* — Ohlandt, Greeley, Ruggiero & Perle, L.L.P.

(57) ABSTRACT

A fitout article or article of equipment for a kitchen or laboratory is provided. The article has a lighting and separating element. The separating element in a region of the lighting element has light transmittance of at least 0.1% and less than 12%. The lighting element in the interior emits light that passes through the separating element and to the exterior. The separating element has a glass or glass-ceramic substrate having a CTE of 0 to 6 ppm/K and has a colour locus in the CIELAB colour space with the coordinates L* of 20 to 40, a* of −6 to 6 and b* of −6 to 6. D65 standard illuminant light, after passing through the separating element, is within a white region W1 determined in the chromaticity diagram CIExyY-2° by the following coordinates:

(Continued)

| White region W1 | |
|---|---|
| x | y |
| 0.27 | 0.21 |
| 0.22 | 0.25 |
| 0.32 | 0.37 |
| 0.45 | 0.45 |
| 0.47 | 0.34 |
| 0.36 | 0.29. |

19 Claims, 2 Drawing Sheets

(51) Int. Cl.
  *C03C 10/00* (2006.01)
  *C03C 4/02* (2006.01)
  *C03C 3/097* (2006.01)
  *C03C 3/087* (2006.01)
  *C03C 17/22* (2006.01)
  *C03C 17/23* (2006.01)
  *C03C 4/10* (2006.01)
  *C03C 17/00* (2006.01)
  *C03B 27/012* (2006.01)
  *F24C 7/08* (2006.01)

(52) U.S. Cl.
  CPC ............ *C03C 4/10* (2013.01); *C03C 10/0009* (2013.01); *C03C 10/0018* (2013.01); *C03C 17/007* (2013.01); *C03C 17/22* (2013.01); *C03C 17/23* (2013.01); *C03B 27/012* (2013.01); *C03C 10/009* (2013.01); *C03C 10/0045* (2013.01); *C03C 10/0054* (2013.01); *C03C 2217/228* (2013.01); *C03C 2217/72* (2013.01); *F24C 7/082* (2013.01)

(56) References Cited

U.S. PATENT DOCUMENTS

| | | | |
|---|---|---|---|
| 4,140,645 A | 2/1979 | Beall et al. | |
| 4,285,728 A | 8/1981 | Babcock | |
| 4,455,160 A | 6/1984 | Rittler | |
| 4,461,839 A | 7/1984 | Rittler | |
| 4,526,872 A | 7/1985 | Kndrieu | |
| 4,835,121 A | 5/1989 | Shibuya et al. | |
| 5,010,041 A | 4/1991 | Koyama | |
| 5,212,122 A | 5/1993 | Pannhorst | |
| 5,256,600 A | 10/1993 | Pfitzenmaier | |
| 5,446,008 A | 8/1995 | Krolla | |
| 6,413,906 B1 | 7/2002 | Shimatani et al. | |
| 7,473,660 B2 | 1/2009 | Comte | |
| 8,722,554 B2 | 5/2014 | Comte | |
| 8,765,619 B2 | 7/2014 | Brunet | |
| 9,061,937 B2 | 6/2015 | Siebers et al. | |
| 9,156,727 B2 | 10/2015 | Siebers et al. | |
| 2002/0011481 A1 | 1/2002 | Melson | |
| 2002/0023463 A1 | 2/2002 | Siebers | |
| 2002/0058117 A1 | 5/2002 | Schultheis | |
| 2003/0054935 A1 | 3/2003 | Kitamura | |
| 2003/0218001 A1 | 11/2003 | Siebers | |
| 2004/0198579 A1 | 10/2004 | Horsfall | |
| 2005/0252503 A1 | 11/2005 | Siebers | |
| 2005/0255983 A1 | 11/2005 | Becker | |
| 2007/0004578 A1 | 1/2007 | Comte | |
| 2007/0056961 A1 | 3/2007 | Shimatani | |
| 2007/0108184 A1 | 5/2007 | Imamoto | |
| 2007/0129231 A1 | 6/2007 | Comte | |
| 2007/0232476 A1 | 10/2007 | Siebers | |
| 2007/0293386 A1 | 12/2007 | Goto | |
| 2008/0026927 A1 | 1/2008 | Comte | |
| 2008/0090034 A1 | 4/2008 | Harrison | |
| 2008/0139375 A1 | 6/2008 | Vvennemann | |
| 2008/0184740 A1 | 8/2008 | Waldschmidt | |
| 2008/0207424 A1 | 8/2008 | Aitken | |
| 2009/0018007 A1 | 1/2009 | Siebers | |
| 2010/0047556 A1 | 2/2010 | Bockmeyer | |
| 2010/0130341 A1 | 5/2010 | Wondraczek | |
| 2010/0304944 A1 | 12/2010 | Comte | |
| 2011/0140843 A1 | 6/2011 | Nireki | |
| 2011/0226231 A1 | 9/2011 | Siebers | |
| 2012/0067865 A1 | 3/2012 | Siebers | |
| 2012/0085336 A1 | 4/2012 | Brunet | |
| 2013/0070451 A1 | 3/2013 | Mulet | |
| 2013/0098903 A1 | 4/2013 | Di Giovanni | |
| 2013/0140293 A1 | 6/2013 | Schott Ag | |
| 2013/0178353 A1 | 7/2013 | Comte | |
| 2013/0201678 A1 | 8/2013 | Siebers | |
| 2013/0328946 A1 | 12/2013 | Zenker | |
| 2014/0009370 A1 | 1/2014 | Weiss | |
| 2014/0146530 A1 | 5/2014 | Guiset | |
| 2014/0146538 A1 | 5/2014 | Zenker | |
| 2014/0238971 A1 | 8/2014 | Comte | |
| 2014/0356608 A1 | 12/2014 | Lentes | |
| 2015/0266770 A1* | 9/2015 | Miyasaka | ............... C03C 3/078 428/34.4 |
| 2015/0266771 A1* | 9/2015 | Miyasaka | ............... C03C 3/097 428/34.4 |
| 2015/0274579 A1 | 10/2015 | Plevacova | |
| 2016/0031755 A1 | 2/2016 | Hoppe | |
| 2016/0168018 A1 | 6/2016 | Gabel | |
| 2016/0176752 A1 | 6/2016 | Gabel | |
| 2016/0281961 A1 | 9/2016 | Laluet | |
| 2016/0334094 A1* | 11/2016 | Bach | ................... F21V 33/0044 |
| 2017/0016627 A1* | 1/2017 | Charpentier | ............ F24C 15/10 |
| 2017/0023260 A1* | 1/2017 | Charpentier | ........ C03C 10/0054 |
| 2017/0215236 A1 | 7/2017 | Doerk | |
| 2019/0059131 A1* | 2/2019 | Debreyer | ................. H05B 3/74 |
| 2019/0062201 A1 | 2/2019 | Weiss | |
| 2019/0194061 A1* | 6/2019 | Weiss | ................... C03C 10/0027 |
| 2019/0194062 A1* | 6/2019 | Wolfinger | ............... C03C 1/002 |
| 2019/0194065 A1* | 6/2019 | Henn | ........................ C03C 4/08 |
| 2019/0246788 A1* | 8/2019 | Demol | ..................... F24C 15/10 |
| 2020/0048144 A1* | 2/2020 | Guedon | .................. C03C 3/087 |
| 2020/0189965 A1 | 6/2020 | Comte | |

FOREIGN PATENT DOCUMENTS

| | | |
|---|---|---|
| CN | 1454189 | 11/2003 |
| CN | 1696072 | 11/2005 |
| CN | 1784363 | 6/2006 |
| CN | 1871179 | 11/2006 |
| CN | 101085699 | 12/2007 |
| DE | 1796298 | 5/1972 |
| DE | 2705948 | 9/1977 |
| DE | 2844030 | 4/1979 |
| DE | 3345316 | 6/1984 |
| DE | 3927174 | 2/1990 |
| DE | 1321373 | 1/1995 |
| DE | 19939787 | 2/2001 |
| DE | 10338165 | 3/2005 |
| DE | 102007036407 | 9/2008 |
| DE | 102008031428 | 1/2010 |
| DE | 102008040097 | 1/2010 |
| DE | 102008050263 | 4/2010 |
| DE | 102009013127 | 9/2010 |
| DE | 102011050873 | 6/2012 |
| DE | 202011110029 | 10/2012 |
| DE | 102014226986 | 6/2016 |
| DE | 102015103461 | 9/2016 |
| DE | 102016101036 | 7/2017 |
| DE | 102017101114 | 7/2017 |
| DE | 102016103524 | 8/2017 |
| DE | 202018100558 | 2/2018 |
| EP | D220333 | 5/1987 |
| EP | 1074520 | 2/2001 |
| EP | 1465460 | 10/2004 |
| EP | 1398303 | 11/2005 |
| EP | 1837312 | 9/2007 |
| EP | 2435378 | 7/2014 |

(56) References Cited

FOREIGN PATENT DOCUMENTS

| | | |
|---|---|---|
| EP | 2817265 | 12/2014 |
| EP | 3208545 | 8/2017 |
| EP | 3049374 | 11/2017 |
| ES | 2344267 | 11/2015 |
| FR | 3002532 | 8/2014 |
| GB | 1562332 | 3/1980 |
| GB | 2430249 | 2/2009 |
| JP | H0551235 | 3/1993 |
| JP | H11100229 | 4/1999 |
| JP | H11100230 | 4/1999 |
| JP | H111100231 | 4/1999 |
| JP | 2004251615 | 9/2004 |
| JP | M 05063949 | 3/2005 |
| JP | 6086311 | 3/2017 |
| WO | 0216279 | 2/2002 |
| WO | 2010013700 | 2/2010 |
| WO | 2010102859 | 9/2010 |
| WO | 2010137000 | 12/2010 |
| WO | 2011089220 | 7/2011 |
| WO | 2012010278 | 1/2012 |
| WO | 2012076412 | 6/2012 |
| WO | 2012076414 | 6/2012 |
| WO | 2012168011 | 12/2012 |
| WO | 2013124240 | 8/2013 |
| WO | 2014170275 | 10/2014 |
| WO | 2018224556 | 12/2018 |

OTHER PUBLICATIONS

D65 "Standard Illuminant Light", Wikipedia, Apr. 14, 2008.
ISO 7991, "Glass—Determination of coefficient of mean linear thermal expansion", Dec. 15, 1987, 12 pages.
DIN 52324 (replaced by DIN ISO 7884-8), "Glass—Viscosity and viscometric fixed points—Part 8: Determination of (dilatometric) transformation temperature", Feb. 1998, 7 pages.
DIN EN 410, "Glass in building—Determination of luminous and solar characteristics of glazing", Apr. 2011, 66 pages.
ASTM D1003-13, "Standard Test Method for Haze and Luminous Transmittance of Transparent Plastics", Nov. 15, 2013, 7 pages.
DIN EN ISO 11664-4 "Colorimetry—Part 4: CIE 1976 L*a*b* Colour space", Jun. 2012, 12 pages.
Glass Ceramic transmission: Schott Nextrema optical properties, Schott North America, Oct. 2017.

* cited by examiner

FITOUT ARTICLES AND ARTICLES OF EQUIPMENT FOR KITCHENS OR LABORATORIES WITH A LIGHTING ELEMENT

CROSS REFERENCE TO RELATED APPLICATIONS

This application claims benefit under 35 USC 119 of German Application 10 2017 131 113.0 filed Dec. 22, 2017, and German Application 10 2018 110 910.5 filed on May 7, 2018, the entire contents of both of which are incorporated herein by reference.

BACKGROUND OF THE INVENTION

1. Field of the Invention

The invention relates to fitout articles or articles of equipment for kitchens or laboratories having a thermally stable glass or glass ceramic substrate and a lighting element.

2. Description of Related Art

Sheets of glass or glass ceramic are used in various ways in fitout articles and articles of equipment for kitchens and laboratories. According to the requirements, for example, on chemical or thermal stability or the optical properties, different glasses or glass ceramics are selected for this purpose.

For example, sheets of glass or glass ceramic are encountered as viewing window in doors of ovens, refrigerators and microwave devices, as cover glass for operating elements of cooking appliances and coffee machines, as worktop for a kitchen cabinet or piece of laboratory furniture, both in the private and professional sphere.

It is ever more frequently the case that such articles additionally have a lighting element intended, for example, to show a state of operation or for decorative lighting.

The technical challenge in the use of lighting elements in fitout articles and articles of equipment with panes of glass or glass ceramic is that, on the one hand, the light emitted by the lighting elements should have good perceptibility by a user of the article but, on the other hand, the user's view of the interior (4) of the article should be concealed. There is thus a trade-off between the demands of the transmission properties of the glass or glass ceramic, which should be as high as possible on the one hand, and as low as possible on the other.

A simple approach to a solution known from the prior art is to provide a transparent non-coloured glass or a transparent non-coloured glass ceramic with an opaque coating and to provide this with cutouts in the regions in which light is to be transmitted. However, such cutouts have good visual perceptibility even when the respective lighting element is switched off, which is perceived to be troublesome for aesthetic reasons.

A coloured material, no matter what kind, is understood to mean any material which, owing to its composition, absorbs transmitted light such that it has a light transmittance of at most 80%. Coloured materials thus contain colouring or absorbing constituents in their composition. These may, for example, be dyes, pigments or other colouring chemical compounds. By contrast, materials are not considered to be coloured when they have an intrinsic light transmittance of more than 80%, but have a colouring, for example coloured, coating on their surface.

Another approach to a solution is to use dark-coloured glasses or glass ceramics. Coloured glass ceramics for cooking surfaces, for example, generally contain vanadium ions for colouring since these have the special property of absorbing in the visible light region and permitting high transmission in the infrared radiation region. Such colouring by means of $V_2O_5$ is known, for example, from DE 10 2008 050 263 A1. In conjunction with lighting elements, the problem occurs in such coloured glass ceramics that the transmission characteristics in the visible spectral region are such that there is distortion of the colours shown by the display device by the glass ceramic. One means of correcting this unwanted colour shift is the mounting of a colour compensation filter, but this is associated with additional work. Such colour compensation filters are known from DE 10 2011 050 873 A1.

The same is also true of transparent non-coloured glass ceramics with a transparent coating. GB 2430249 B discloses, for example, a sputtered underside coating for a glass ceramic cooktop, which has higher transmission in the red spectral region than in the blue or green and hence behaves similarly to a coloured glass ceramic. In the case of such a coating, it is likewise possible to provide an additional colour compensation filter.

Furthermore, coated or coloured glasses that are specifically optimized not to shift the colour locus of light that passes through it are also known from optical applications. Such systems, also known as neutral density filters or grey glasses, are unsuitable for use in kitchens or laboratories owing to inadequate thermal or chemical stability. Particularly mirrored neutral density filters are generally unsuitable for use in kitchens or laboratories since they clearly show even slight stains and scratches and are therefore difficult to clean. Specifically, neutral density filters and grey glasses do not have the transparency in the infrared spectral region needed for use in cooking appliances.

SUMMARY

It is an object of the invention to provide a fitout article or article of equipment for a kitchen or laboratory having a lighting element, which overcomes or at least improves on the disadvantages that exist in the prior art.

Such a fitout article or article of equipment for a kitchen or laboratory comprises a lighting element and a separating element, wherein the separating element divides at least sections of an interior of the article from an exterior and comprises a glass or glass ceramic substrate having a coefficient of thermal expansion of 0 to 6 ppm/K in the temperature range between 20° C. and 300° C. The lighting element is disposed here in the interior of the article such that the light emitted by the lighting element passes through the separating element and is perceptible by a user in the exterior of the article. The separating element, in the region of the lighting element, i.e. in the region in which the light emitted by the lighting element is to pass through the separating element, has a light transmittance of at least 0.1% and less than 12%. In addition, the separating element has a colour locus in the CIELAB colour space with the coordinates L* of 20 to 40, a* of −6 to 6 and b* of −6 to 6, measured in reflectance with D65 standard illuminant light against a black trap. The separating element is not least characterized in that the colour locus of D65 standard illuminant light, after passing through the separating element, is within a white region W1 determined in the chromaticity diagram CIExyY-2° by the following coordinates:

| White region W1 | |
|---|---|
| x | y |
| 0.27 | 0.21 |
| 0.22 | 0.25 |
| 0.32 | 0.37 |
| 0.45 | 0.45 |
| 0.47 | 0.34 |
| 0.36 | 0.29 |

In the context of the present invention, a fitout article or article of equipment for a kitchen or laboratory is generally understood to mean a piece of kitchen or laboratory furniture or a preferably electrically operated kitchen or laboratory appliance, irrespective of its specific design. Kitchen or laboratory furniture is especially understood to mean cupboards and tables that have a worktop on their top face. Kitchen appliances such as cooking appliances, refrigerators, microwave devices, grills, baking ovens, steam cookers, toasters or extractor hoods may be designed either for the private or the professional sector. The article may likewise be a separately arranged control panel, by means of which a user can operate one or more appliances actuatable therewith. Appliances of the invention may, for example, be integrable into kitchen or laboratory furniture or be freestanding. The laboratory appliances also include ovens, climate chambers, refrigerators or hotplates.

An article of the invention includes at least one lighting element. Lighting elements of this kind may, for example, have LEDs, OLEDs, laser diodes, halogen lamps or fluorescent tubes for production of the light, and suitable means of shaping and emitting the light, such as mirrors, lenses, spatial light modulators (SLMs), optical fibres or the like. More particularly, the suitable lighting elements include, for example, white, red, blue, green or RGB LEDs, or white, red, blue, green or RGB seven-segment displays. Preferably, the lighting element has at least two intensity maxima in the visible spectral region, i.e. local maxima in the emission spectrum at two different wavelengths. This is the case, for example, in white and RGB LEDs or white OLEDs, even when they are executed as seven-segment displays.

Lighting elements may especially also be disposed in the hot region in the vicinity of heating elements. In this case, especially for the production of white lighting effects in the exterior of the article, it is advantageous that no temperature-sensitive black-body compensation filters are required.

Preferably, the lighting element may be executed as a red display element. More particularly, it can be executed as a red segment display or red TFT display. Red TFT displays may be executed, for example, as an LCD display with red backlighting or as a red OLED display.

In addition, an article of the invention comprises a separating element that divides at least sections of an interior of the article from an exterior and that comprises a glass or glass ceramic substrate.

In the case of a kitchen or laboratory appliance, the separating element may thus be at least part of the housing or, if appropriate, of a door of the appliance. One example of this is a cooking plate that divides the interior of a cooktop in which, apart from a display device, there are heating elements, for example, from the exterior thereof where the user of the cooktop is present. Viewing windows in baking oven or microwave doors are likewise separating elements of the invention. In kitchen or laboratory furniture, such separating elements may constitute at least part of the furniture body or of the front of a door or drawer. More preferably, the separating element is part or even the entire work surface of a piece of kitchen or laboratory furniture.

For any form of fitout articles and articles of equipment for kitchens and laboratories, thermal cycling stability and chemical stability are particularly important parameters. Especially for parts of appliances where high temperatures arise in the use thereof, such as cooktops, hotplates, ovens, baking ovens with pyrolysis function, microwaves or grills, particularly high demands are applicable. But it is also necessary for virtually all other areas of a kitchen or laboratory to be thermally stable since there is always the risk that they will come into contact with hot or very cold articles or liquids. In the event of such contact, there is a very rapid change in the temperature in a locally limited region, which leads to stresses in the material which can lead rapidly to destruction particularly in the case of materials that are prone to brittle fracture, such as glass and glass ceramic.

The most effective way of achieving very good thermal stability is in that the glass or glass ceramic substrate has a linear coefficient of thermal expansion CTE, to ISO 7991, between $-2.5$ and at most $2.5 \times 10-6/K$, preferably between $-1.5 \times 10-6/K$ and at most $1.5 \times 10-6/K$, in the temperature range between 20° C. and 300° C., preferably between 20° C. and 700° C. Especially in the case of glass ceramics, the CTE within this temperature range may also assume negative values. In the case of such a low coefficient of thermal expansion, even large temperature gradients do not lead to the building of stresses in the substrate. This value is achieved, for example, by quartz glass or by lithium aluminium silicate glass ceramics (LAS glass ceramics), for example of the CERAN® brand from SCHOTT AG.

The higher the magnitude of the CTE of the glass or glass ceramic and the greater the temperature gradients that possibly occur in use, the higher the risk of stress-induced fractures. This can be counteracted in that the glass or glass ceramic is thermally or chemically tempered. Such tempering gives rise to a compressive stress at the surface of the glass that counteracts the thermal stress.

Particular preference is given here to thermal tempering for economic reasons. However, for technical reasons, it can be conducted only in the case of glasses having a thickness of at least 2 mm and a CTE over and above $3.5 \times 10-6/K$. In addition, the glass transition temperature Tg of the glasses, measured to ISO 7884-8 or DIN 52324, must not exceed a value of about 650° C., particularly in the case of glasses having a CTE between 3.5 and $6 \times 10-6/K$, in order that tempering with conventional tempering ovens can achieve sufficiently high tempering values of more than about 10 MPa.

Glasses having a CTE between 20 and 300° C. of more than $6 \times 10-6/K$ are generally, i.e. even in tempered form, unsuitable for use in kitchens and laboratories. The glass or glass ceramic substrate for the article of the invention thus has to have a CTE between 20 and 300° C. of not more than $6 \times 10-6/K$. Glasses having higher CTE, for example soda-lime glass having a CTE of about $9 \times 10-6/K$, can generally be efficiently thermally tempered. Nevertheless, the tempering values achievable are insufficient to be able to compensate for the stresses that arise as a result of the great thermal expansion under thermal stress. Both for thermally and chemically tempered glass substrates, it should be noted that the tempering is degraded by stress at high temperatures over prolonged periods. The lower the Tg of the glass, the quicker this degradation proceeds. Therefore, tempered glasses for use in kitchens and laboratories have to have a Tg of at least 500° C., preferably at least 550° C. Thus, preference is given to using glass ceramics having a CTE between 20 and 300° C. of less than 2.5×10−6/K or glasses having a CTE between 20 and 300° C. of 3.5 to 6×10−6/K and a Tg of 500 to 650° C., especially of 550 to 650° C.

A factor of similarly great importance to thermal stability is the chemical stability of the glass or glass ceramic substrate to acids and alkalis. In laboratories, this is generally advantageous owing to the handling of chemicals; in kitchens, in particular, resistance to cleaning products and food constituents is important. Especially glasses having high proportions of more than 10% by weight based on oxide of alkali metals or alkaline earth metals, for example soda-lime glass, are therefore unsuitable for articles of the invention.

The separating element, in the region of the lighting element, i.e. in the region in which the light emitted by the lighting element is to pass through the separating element, has a light transmittance of at least 0.1% and less than 12%. Preferably, the separating element, in the range of the lighting element, has a light transmittance of at least 0.5%, preferably at least 0.9%, more preferably at least 1%, especially at least 2% or even at least 3%. In addition, it preferably has a light transmittance of less than 9%, preferably less than 7%, more preferably less than 5%, especially less than 4% or even less than 3%. The light transmittance may thus, for example, be within at least one of the ranges of 0.1% to 5.0%, 0.5% to 3.0%, 0.9% to 2.0%, 1% to 9%, 2% to 7% or 3% to 4%.

Within this transmission range, sufficient light from a lighting element can pass through the separating element, with simultaneous concealment of view into the interior of the article. In the case of light transmittances over and above about 2%, it may be advantageous to additionally dispose a means of reducing total transmission between separating element and lighting element.

Such a means is disposed on the side facing the interior, in order that it is protected from outside influences, especially damage by mechanical stresses. Such a means may be a coating on the glass or glass ceramic substrate, a film, a self-supporting carrier material, for example a sheet or film of glass, plastic or insulation materials, which contain sheet silicates such as mica or fibrous materials. For achievement of the desired light transmittance, two or more of these means may also be combined. For this purpose, for example, multiple coatings or coated films or carrier materials may be used.

It is advantageous to match the light transmittance of such a means to that of the separating element. Advantageously, the higher the light transmittance of the separating element, the lower the light transmittance of the means of reducing the total transmission will be. It is particularly advantageous to adjust the overall transmission of separating element and covering means to a value of 2% or less.

Means of reducing total transmission in the form of coatings may be produced, for example, on the basis of enamel, sol-gel materials or coloured silicones. Enamel-based coatings suitable for kitchen appliances are known, for example, from DE 10 2015 103 461 A1. One disclosure therein is that use of a glass flux based on the LAS material system, with addition of spinel-based pigments, for example Co(Cr,Fe)2O4 or (Mn,Fe)2O3, can achieve colour loci such as L*=25, a*=0 and b*=−0.5 or L*=27, a*=2 and b*=1. The pigments and the amount thereof in the coating composition can be selected such that, for the intended layer thickness of the coating, light transmittance is less than 15%, for example. If appropriate, the light transmittance can also be reduced by multilayer coating.

DE 10 2008 031 428 A1 discloses sol-gel-based coatings that are suitable for kitchen appliances and have a colour locus that can be established within the range of 30<L*<85, −8<a*<8 and −8<b*<8. For this purpose, a mixture of tetraethoxyorthosilane (TEOS) and triethoxymethylsilane (TEMS) is prepared, wherein alcohol may be added as solvent. An aqueous metal oxide dispersion, especially an SiO2 dispersion in the form of colloidally dispersed SiO2 particles, is mixed with acid, preferably hydrochloric acid. The two separately prepared mixtures can be stirred for improved homogenization. Subsequently, the two mixtures are combined and mixed. Advantageously, it is possible to mature this mixture, preferably with constant stirring, for one hour for example. Parallel to the making-up of this mixture, it is possible to weigh out pigments and optionally further fillers, preferably fumed silica, add them to the maturing mixture and disperse them therein. For black layers, a pigment mixture with 67% by weight of coated pigments in platelet form and 33% by weight of fine pulverulent graphite is used.

Light transmittance is determined in the wavelength range of 380 nm to 780 nm using D65 standard illuminant light to DIN EN 410. In terms of its value, light transmittance is identical to the brightness Y in the CIExyY-2° colour space.

In a preferred embodiment, the separating means has a transmission at a wavelength of 630 nm of at least 2%, preferably at least 4% and more preferably at least 10%.

In a further preferred embodiment, transmission at a wavelength of 470 nm is at least 1%, preferably at least 2%, more preferably at least 4%.

In a preferred embodiment of the invention, the separating element comprises at least one scattering or diffuser layer disposed in the interior between substrate and lighting element, preferably with at least one covering layer between substrate and lighting element and with at least one cutout in the covering layer.

Scattering and diffuser layers may optionally also be executed in coloured form. Coloured scattering and diffuser layers may simultaneously function as diffuser and as optical filter.

Such scattering or diffuser layers may have a thickness of 1 to 15 μm, for example. They may contain non-coloured scattering particles, for example of TiO2, SiO2, $Al_2O_3$, ZrO2 or other metal oxides. The average size of such particles may be less than 1 μm. Preferably, the scattering or diffuser layers have high homogeneity of the luminance produced, low granularity and high brightness. This results in a perception of a very homogeneously lit area which is very pleasing to the user.

The separating element has a colour locus in the CIELAB colour space with the coordinates L* of 20 to 40, a* of −6 to 6 and b* of −6 to 6, measured in reflectance with D65 standard illuminant light against a black trap. Preferably, the separating element has a colour locus in the CIELAB colour space with L* not more than 35, more preferably not more than 30, most preferably not more than 28, and not less than 22, preferably not less than 25, with a* of −4 to +4, preferably of −2 to 2, more preferably of −1 to 1, and with b* of −4 to +4, preferably of −2 to 2, more preferably of −1 to 1, measured in reflectance.

This colour locus is generally perceived by observers as black or at least as dark, which is preferable for fitout articles and articles of equipment for aesthetic reasons. Colour loci having an L* of more than 40 have too light an appearance to be perceived as black. Colour loci having a magnitude of |a*| greater than 6 and/or a magnitude of |b*| greater than 6 are clearly perceived as coloured and not as black. The smaller the values of L*, |a*| and |b*|, the darker and less chromatic the perception of the shade.

Separating elements having an L* of less than 40 and especially of less than 35, 30 or even 28 additionally have the advantage over separating elements having a higher L* value that they reflect less light overall by comparison. As a result, the light from lighting elements mounted in the interior of an article of the invention can be better perceived by an observer in the exterior since the contrast, i.e. the ratio between transmitted brightness of the lighting element to reflected brightness of the ambient light, is greater. This is advantageous particularly in typical installation situations of fitout articles and articles of equipment with bright ambient lighting, as is typically the case, for example, in the case of workplace lighting in kitchens and laboratories. In this way, it is also possible to improve user comfort and user safety of such an article. This is especially advantageous by comparison with transparent non-coloured glasses and glass ceramics having sputtered metallic coatings, for example of titanium or silicon. Such metallic coatings typically have an L* value of more than 70.

These colour coordinates are measured by placing the separating element onto a black trap and then using a commercial colorimeter, for example the Konica Minolta CM-700d spectrophotometer, using the D65 standard illuminant, a 10° standard observer, to measure the colour locus in reflectance. The black trap used may, for example, be the CM-A511 black glass tile from Konica Minolta. In this context, the expression "measurement against a black trap" means that the sample to be measured is disposed between the measuring instrument and a black trap.

In addition, the separating element is characterized in that the colour locus of D65 standard illuminant light, after passing through the separating element, is within a white region W1 determined in the chromaticity diagram CIExyY–2° by the following coordinates:

| White region W1 | |
|---|---|
| x | y |
| 0.27 | 0.21 |
| 0.22 | 0.25 |
| 0.32 | 0.37 |
| 0.45 | 0.45 |
| 0.47 | 0.34 |
| 0.36 | 0.29 |

The white region W1 is determined here as a region along the black-body curve in the CIExyY colour space that ranges from colour temperature about 2750 K to about 1 000 000 K and is shifted upward at the upper limit by a value of about y=0.04 relative to the black-body curve and downward at the lower limit by about y=0.07. This results in the following effect: by definition, D65 standard illuminant light has a colour temperature of about 6500 K and, when observed directly by a 2° observer, a colour locus of x=0.31 and y=0.33. By the present invention, it is thus possible, on passage of light through the separating element, to shift the colour locus of the light essentially along the black-body curve, either to higher or to lower colour temperatures, without producing an unwanted tint. White light after passing through is thus still perceived as white light.

The colour locus of light after passage through the separating element can be measured, for example, with the Konica Minolta CS-150 colorimeter. It is likewise possible to measure the transmission spectrum of the substrate and to use this, with the aid of the known spectrum of D65 standard light and the eye sensitivity of a 2° normal observer in accordance with specifications of the CIE, to calculate the colour locus.

In a preferred embodiment, the separating element is characterized in that the colour locus of D65 standard illuminant light, after passing through the separating element, is within a white region W2 determined in the chromaticity diagram CIExyY–2° by the following coordinates:

| White region W2 | |
|---|---|
| x | y |
| 0.25 | 0.27 |
| 0.32 | 0.36 |
| 0.41 | 0.42 |
| 0.42 | 0.36 |
| 0.35 | 0.31 |
| 0.27 | 0.24 |

The white region W2 is determined here as a region along the black-body curve in the CIExyY colour space that ranges from colour temperature about 3500 K to about 20 000 K and is shifted upward at the upper limit by a value of about y=0.025 relative to the black-body curve and downward at the lower limit by about y=0.04. By comparison with W1, this region thus extends along a shorter section of the black-body curve and has a smaller deviation in the x and y coordinates from the black-body curve.

This section of the black-body curve from 3500 K to 20 000 K corresponds to the colour loci that can be covered by natural sunlight. Evening sunlight shortly before the commencement of dusk corresponds to a black-body radiator at about 3500 K; a clear sky at midday corresponds to a black-body radiator at about 20 000 K. Colour loci at or close to the black-body curve, particularly in this region, are therefore perceived as white and particularly natural.

More preferably, the separating element is characterized in that the colour locus of D65 standard illuminant light, after passing through the glass or glass ceramic substrate of the separating element, is within a white region W3 that extends along the black-body curve in the CIExyY colour space from colour temperature of about 5000 K to about 20 000 K and is shifted upward at the upper limit by a value of about y=0.025 relative to the black-body curve and downward at the lower limit by about y=0.04. The white region W3 thus corresponds essentially to region W2, but begins only at a colour temperature of 5000 K. This colour region corresponds to daylight white and is correspondingly pursued by the human observer as particularly pure white, especially as cold white:

| White region W3 | |
|---|---|
| x | y |
| 0.250 | 0.270 |
| 0.290 | 0.320 |
| 0.340 | 0.370 |
| 0.360 | 0.320 |
| 0.310 | 0.280 |
| 0.270 | 0.240 |

This is surprisingly possible by the present invention even without the use of a black-body compensation filter to compensate for the transmission profile of the separating element. In the context of the present invention, a black-body compensation filter is understood to mean an optical filter having a transmission spectrum matched to the transmission spectrum of the separating element such that D65 standard illuminant light, after passing through the black-body compensation filter and the separating element, has a colour locus with coordinates within the white region W1 or if appropriate W2.

According to the invention, such a filter is unnecessary since D65 standard illuminant light, after passing through the separating element, already has a colour locus in this region. Such a filter may optionally nevertheless be disposed between the separating element and a display device, for example when different regions of the separating element for transmitted D65 standard illuminant light are to produce different colour loci within the region W1 or W2.

Black-body compensation filters may take the form, for example, of printed-on, applied, pressed-on or correspondingly arranged layers, films or sheets. Other colour compensation filters are also conceivable, for example in order to produce lighting effects outside the white region W1. For example, white light emitted in the interior of the article can be rendered in coloured form to an observer in the exterior, for example with a blue, red, green or any other colour. Separating elements that fulfil the abovementioned requirement comprise, for example, novel glass ceramic substrates that consist of a transparent coloured LAS glass ceramic and comprise, as colouring components, 0.003-0.25% by weight of MoO3, less than 0.2% by weight of Nd2O3 and less than 0.015% by weight of V2O5.

These novel glass ceramics, which are distinctly more colour-neutral compared to the prior art, owing to their transmission characteristics, offer great advantages in modular assembly, for example in the case of the cooktops of modular construction that are customary on the market and likewise in combination with other glassed appliances, for example baking ovens with colour-neutral front glasses or glass-fronted refrigerators.

The transparent coloured glass ceramics differ here from the transparent non-coloured glass ceramics in that transmission is lowered via the controlled addition of one or more colouring compounds that absorb in the visible. These colouring compounds as a constituent of the composition of a coloured glass ceramic thus increase the coefficient of absorption of the glass ceramic by comparison with a non-coloured glass ceramic. The resulting spectral progression of the transmission curve for a defined thickness gives rise to the colour of the glass ceramic and the brightness thereof.

Also used synonymously in the literature with the term "coloured glass ceramic" is the term "volume-coloured glass ceramic". Both terms emphasize the fact that the glass ceramic contains colouring constituents in its composition that affect the coefficient of absorption of the glass ceramic. Thus, these materials differ fundamentally from non-coloured glass ceramics that have a coloured coating for colouring of an article produced therefrom. Such a coating has no effect at all on the coefficient of absorption of the glass ceramic.

A minimum content of 0.003% by weight of MoO3 is required in the case of such preferred glass ceramics in order to obtain the desired colour effect. If lower light transmission is desired, higher MoO3 contents are required. Equally, in the case of increasing Fe2O3 or V2O5 contents, higher MoO3 contents are required since both Fe2O3 and V2O5 alter the transmission characteristics of the glass ceramic such that the colour locus of D65 standard illuminant light after passing through the glass ceramic is shifted away from the black-body curve, especially toward red hues. Preferably, for establishment of the colour effect, at least 0.01%, preferably at least 0.03%, by weight of MoO3 is present. Since different valences of the Mo atom are present in the glass ceramic, the stated contents of the composition are based analytically on this compound. As the upper limit, the MoO3 content is preferably 0.3%, further preferably 0.25% and more preferably 0.2% by weight.

With a content of 0.003-0.25% by weight of MoO3, it is possible to adjust the light transmittance of a glass ceramic substrate of thickness 2 to 8 mm to a value of 0.1% to <12%.

It has been found that the addition of MoO3 brings about lowering of the glass viscosity and is favourable for the fusibility and refining of the glass. However, particularly the reduced molybdenum oxide species also act as nucleating agents and can worsen the devitrification stability. It is therefore advantageous to limit the content.

These glass ceramics contain less than 0.2% by weight of Nd2O3 since, in the case of this colour oxide, the colour effect arises via narrow absorption bands in the region of 526, 584 and 748 nm. Light in these wavelength ranges is more strongly absorbed by the glass ceramic on passage. The preferred Nd2O3 content is less than 0.06% by weight. More preferably, no Nd2O3 is used and the glass ceramic is free of Nd2O3 for technical purposes. In that case, generally less than 10 ppm of impurities are present.

Particularly the V2O5 component moves the colour locus of transmitted D65 standard illuminant light to higher x values in the CIE colour system, i.e. into the orange-red. The component is suitable in small amounts for combination colouring with MoO3. However, V2O5 colours more intensely, and so the content has to be limited in order to achieve the colour effect of the invention. Higher contents than 0.015% by weight are therefore unfavourable. Preferably, the V2O5 content is less than 0.01% by weight and further preferably not more than 0.005% by weight. More preferably, no V2O5 is added to the composition and only impurities of a few ppm, usually 1-15 ppm, are present in the glass ceramic. The molybdenum oxide is thus the main colourant, and the following component relationship is applicable: MoO3/V2O5>1, preferably >3, more preferably >5.

A preferred composition of such a glass ceramic that meets the abovementioned demands, in by weight based on oxide, consists essentially of:

| | |
|---|---|
| Li2O | 2.5-5.5 |
| Σ Na2O + K2O | 0.1-<4 |
| MgO | 0-3 |
| Σ CaO + SrO + BaO | 0-5 |
| ZnO | 0-4 |
| B2O3 | 0-3 |
| Al2O3 | 16-26 |
| SiO2 | 58-72 |
| TiO2 | 1.5-5.5 |
| ZrO2 | 0-2.5 |
| SnO2 | 0.1-<0.7 |
| Σ TiO2 + ZrO2 + SnO2 | 3-6.5 |
| P2O5 | 0-5 |
| MoO3 | 0.003-0.5 |
| Fe2O3 | 0-0.025 |
| V2O5 | 0-0.015 |
| Nd2O3 | 0-<0.02 |
| Cr2O3 | 0-<0.01. |

The term "consists essentially of" means that the components listed are to make up at least 96%, generally at least 98%, of the overall composition. These glass ceramics optionally contain additions of chemical refining agents such as As2O3, Sb2O3, CeO2, and of refining additions such as manganese oxide, sulfate compounds, halide compounds (F, Cl, Br) in total contents up to 2.0% by weight.

Compounds of a multitude of elements, for example the alkalis Rb, Cs, or elements such as Mn, Hf are customary impurities in batch raw materials used on the industrial scale. Other compounds, for example those of the elements W, Nb, Ta, Y, rare earths, Bi, V, Cr, Ni, may likewise be present as an impurity in batch raw materials used on the industrial scale, typically in the ppm range.

For reasons of environmental protection and occupational hygiene, the use of raw materials that are toxic or a matter of concern is avoided if possible. Therefore, the glass ceramic is preferably free of substances harmful to the environment, such as arsenic (As), antimony (Sb), cadmium (Cd), lead (Pb), caesium (Cs), rubidium (Rb), halides and sulfur (S), apart from unavoidable impurities in the range of preferably 0 to less than 0.5 percent by weight, more preferably less than 0.1 percent by weight, most preferably less than 0.05 percent by weight. The figures in % by weight relate here to the glass composition based on oxide.

In general, either naturally occurring raw materials or chemically processed or synthetically produced raw materials can be used for the production. Naturally occurring raw materials are generally less costly than equivalent chemically processed or synthesized raw materials. However, the usability of natural raw materials is limited by the typically high amounts of impurities. Examples of naturally occurring raw materials are quartz sand, spodumene and petalite. Chemically processed or synthetically produced raw materials generally contain only a very low level of impurities. Examples of commonly used processed or synthesized raw materials are lithium carbonate or titanium dioxide powder.

The impurities through typical trace elements in the technical raw materials used are typically 200 ppm B2O3, 30 ppm Cl, 1 ppm CoO, 3 ppm Cr2O3, 200 ppm Cs2O, 3 ppm CuO, 200 ppm F, 400 ppm HfO2, 3 ppm NiO, 500 ppm Rb2O, 5 ppm V2O5.

Particularly the Cr2O3 content is preferably less than 0.02% by weight, more preferably less than 0.01% by weight, and the glass ceramic is especially free of Cr2O3 apart from the impurities mentioned.

As an alternative to such a transparent glass ceramic substrate coloured by means of molybdenum oxide as main colorant, the separating element may also comprise a transparent non-coloured thermally stable substrate made of glass or glass ceramic with a coating having appropriate optical properties.

The most effective way of achieving very good thermal stability is in that the glass or glass ceramic substrate has a linear coefficient of thermal expansion CTE, to ISO 7991, of not more than ±2.5×10−6/K, preferably not more than ±1.5×10−6/K, in the temperature range between 20° C. and 300° C., preferably between 20° C. and 700° C. Especially in the case of glass ceramics, the CTE within this temperature range may also assume negative values. In the case of such a low coefficient of thermal expansion, even large temperature gradients do not lead to the building of stresses in the substrate. This value is achieved, for example, by quartz glass or by lithium aluminium silicate glass ceramics (LAS glass ceramics), for example of the CERAN® brand from SCHOTT AG. The coefficient of thermal expansion between 20° C. and 300° C. is also referred to as CTE a20/300. The coefficient of thermal expansion between 20° C. and 700° C. is also referred to as CTE a20/700.

For an article of the invention, useful layers are solely those that have a colour locus with L* of 20 to 40, a* of −6 to 6 and b* of −6 to 6, measured in reflectance with D65 standard illuminant light against a black trap in transmission through the glass or glass ceramic substrate. As a result, light-coloured layers in particular, i.e. highly reflective, chromatic and metallic mirror layers, are ruled out.

At the same time, the light transmittance of the layers has to be settable within a range of 0.1% to 12%, measured in transmission through the layer and the substrate.

This means that, for example, transparent layer systems, for example multiple layers of oxides, nitrides and/or oxynitrides, are ruled out. With such interference optics layer systems, it is possible to adjust the a* and b* components of the colour locus in reflectance in a controlled manner, but it is not simultaneously possible to establish a low light transmittance of 0.1% to 12% and low brightness in reflectance, i.e. a L* value between 20 and 40. In the case of such systems, for lack of absorbing materials, it is possible to choose only between high transmission at low reflection, for example anti-reflection layers, and low transmission at high reflectance, for example dichroitic mirrors. Low transmission with simultaneously low reflectance is not achievable.

Apart from these, multiple layer systems, especially for interference optics, are not suitable merely for reasons of cost for fitout articles and articles of equipment for kitchens and laboratories.

These demands are surprisingly met by novel layers based on spinels, cermets, carbides or carbonitrides.

Spinels are known from mineralogy and from ceramic solids. The inventors have found that oxidic spinels, surprisingly, as an alloy in reactively sputtered form from a metallic target with substoichiometric addition of oxygen, have a very low L* value of less than 35. In this way, it is possible in principle to produce dark hues with simultaneously low electrical conductivity. The transmission profile of such layers is also flat, and so D65 standard illuminant light, after passing through such a coating, is within the white region W1.

In the wavelength range of 780 nm to about 4500 nm, coatings of spinels have high spectral transmittances of more than 30% or even more than 50%, up to more than 80%. Essentially, spectral transmittance in the infrared spectral region in the case of cover plates with spinel coatings is limited not by the coating but by the substrate used. Uncoloured transparent LAS glass ceramics, for example of the CERAN CLEARTRANS® brand from SCHOTT AG, with a spinel coating at a wavelength of about 3750 nm have a spectral transmittance of more than 40%. Such coatings are thus especially suitable for use of radiation heating elements or infrared sensors behind or under the separating element. Sheet resistances are more than 1 MΩ/□ at a test voltage of 1000 V. Thus, these layers are also suitable for use with capacitative and inductive sensors and induction coils for energy transmission, for example induction heating elements.

Suitable spinels have a composition of the formula $A_x C_u B_y D_v E_z F_w$ where A and C are selected from the group consisting of Cr2+; Mn2+, Fe2+, Co2+, Ni2+, Cu2+, Zn2+; Al3+, Sn2+/4+, Ti4+, Zr4+, or the lanthanides and mixtures thereof. B and D are selected from the group consisting of Mn3+, Fe3+, Co3+, Ni3+, Cu3+, Al3+, Ga3+, Sn4+, Sc3+, Ti4+, Zn2+, or the lanthanides and mixtures thereof. E and F are preferably selected from the group consisting of the divalent anions of S, Se and O and mixtures thereof. The values of x, u, y, v, z and w satisfy the following formulae:

$0.125 < (x+u)/(y+v) \leq 0.55$ and $z+w=4$.

Preferably, the coating includes crystallites, where at least 95% by weight of the crystallites show symmetric cubic crystal structures of the spinel type.

In order to improve colour neutrality, it is possible to modify the layer system by means of a compensation layer disposed between the substrate and the spinel coating. The L* in reflectance is virtually unaffected thereby. Compensation layers may be materials that have their refractive indices between substrate and spinel coating in the visible spectrum, e.g. CeO2, HfO2, Y2O3, Si3N4, AlN, SiO2, Al2O3, AlTiOx, TiSiOx, SiOxNy, AlSiOxNy. It is also possible to use substoichiometric variants as compensation layer. The layer thickness of such compensation layers is preferably in the range of 25 to 500 nm, more preferably 35 to 250 nm. Surprisingly, such a compensation layer changes only the colour locus of the coating in reflectance, and not the transmission characteristics. Thus, such a compensation layer more particularly does not act as a black-body compensation filter.

In a preferred embodiment, the coating consists of a spinel composed of one of the following material systems: aluminium spinels, chromium spinels, iron spinels, titanium spinels, cobalt spinels. More preferably, the coating consists of CoFeMnCr spinel and optionally has a compensation layer of SiOxNy.

In a further preferred embodiment, the coating consists of a cermet with an oxidic matrix composed of SiO2, Al$_2$O$_3$, ZrO2, TiO2 or mixed oxides thereof and a metallic component composed of Ti, Si, Al, Mo, Zr, Cu, Nb, Co, Cr, W, Ta, Ni, B or an alloy of at least two of these metals. In the context of the present invention, the term "cermets" is understood to mean composite materials composed of an oxidic matrix with a metallic component dispersed therein. Embodiments containing such composite materials are particularly preferred here since they combine the optical properties of the metallic component with the low electrical conductivity of the matrix material and hence are of particularly good suitability for the coating of a cover plate of the invention.

It may be a feature of these cermet layer systems that they have very high sheet resistance, >20 MΩ/□, with adjustable light transmittance of 0.1% to <12%. In these transmission regions, it is possible to produce very colour-neutral layers with low L* value. The average spectral reflectance of cermet coatings with a light transmittance of 0.1% to <12% is about 5% with a ratio of greatest to smallest value in the visible spectral region of about 1.5. The transmission profile of such layers has been found to be very flat, such that D65 standard illuminant light, after passing through the coating, may be in the white region W1 or even in the white region W2. In the infrared spectral range between 780 and 4250 nm, these cermet layer systems have only weak absorption, and so spectral transmittance here too is limited in wide ranges by the substrate and not by the coating. The cermet layers examined, at a wavelength of about 3750 nm, may have a transmittance of more than 40%.

In a preferred embodiment, oxidic matrix and metallic component are matched to one another such that they have elevated thermal stability. Thermal stability can be determined, for example, by measuring the CIELAB colour locus after the sample has been stressed at 380° C. to 80 hours and comparing the measurements with the unstressed sample. A particularly advantageous option here is a material pair of metal having oxygen affinity for formation of the metal oxide matrix and a metal having lower oxygen affinity for the formation of the metallic component in the cermet.

Particular preference is given to SiO2 or Al$_2$O$_3$ as the metal oxide matrix in combination with Mo as the metallic component. Si and Al have a higher oxygen affinity than Mo, which means that the formation of SiO2 or Al$_2$O$_3$ is preferred over Mo oxide. At the same time, in the case of very dense layers, the oxidic matrix acts as oxidation barrier and protects the Mo from oxidation. Mixed oxides, especially composed of SiO2 and Al$_2$O$_3$, are also suitable for use as metal oxide matrix.

In a preferred embodiment, SiO2 is used for the oxidic matrix. In that case, the ratio of Mo to Si in the coating may be at least 5:95, preferably at least 10:90, more preferably 15:85 and especially 20:80, in % by weight. At the same time, it may preferably be at most 50:50, more preferably at most 45:55, especially preferably at most 40:60 and in particular at most 35:65, in % by weight. The ratio of Mo to Si in the coating may thus, for example, be within a range of 5:95 to 50:50% by weight, 10:90 to 45:55% by weight, 15:85 to 40:60% by weight or even 20:80 to 35:65% by weight. These ratios are determined using the proportions by weight of Mo and Si in the coating. This does not take account of the proportion by weight of oxygen or other constituents of the coating. The person skilled in the art will adjust the proportion of oxygen such that the coating meets the respective demands.

In a particularly preferred embodiment, the coating, apart from Mo, Si, oxygen and unavoidable impurities, does not contain any further constituents.

The use of such MoSiOx cermets has been found to be particularly advantageous since these have a particularly flat transmission profile and a particularly flat profile of spectral reflectance, and at the same time high electrical resistance and high thermal stability.

For thermal stabilization, cermets, and also spinels, may additionally be provided with an oxidation barrier. These may be, for example: oxides or nitrides or oxynitrides of at least one of the following materials: Si, Al, Ti, Zr, Sn, Cr, Zn, Nb, Y, Ta, Mo, B. Silicon nitride in particular has been found to be a preferred oxidation barrier for cermets, and silicon oxide in particular for spinels. Oxidation barrier layers can also have a positive effect on transmission in the infrared.

The inventors have found that it is surprisingly possible, with coatings composed of carbides and carbonitrides on glass or glass ceramic, to establish low L* values in the region of 30 at a colour locus of −3<a*<3, −3<b*<3 in reflectance. Furthermore, the layers have an average reflectance of about 4% to 8% and a ratio of maximum to minimum reflectance in the visible spectral region of about 1.5. In the infrared spectral region, these layers even at 950 nm transmit more than 50% and do not have any significant absorption in the range of about 1250 nm to at least 4000 nm, and so the spectral transmission of a cover plate in this range is limited by the substrate.

These layer systems may be produced as individual layers or as a layer system with the compensation layers already described for spinels between substrate and coating and/or with additional oxidation barriers. The person skilled in the art will select here, from the materials described above, a combination with appropriate refractive index between that of the substrate and that of the coating, and an appropriate layer thickness. In the case of use of layers based on carbides or carbonitrides, preferably at least one of the following materials is present in the coating: Si, Zr, W, Ti, Mo, Cr, B, DLC.

All the layer systems mentioned are preferably produced by means of magnetron sputtering, especially by means of reactive moderate-frequency sputtering or high-frequency sputtering. In reactive moderate-frequency sputtering, it is possible to use metallic targets, for example composed of pure metals or composed of alloys, and to supply oxygen or nitrogen, for example, as reactive process gases. Argon is used as non-reactive process gas.

Spinel coatings can be produced, for example, by means of reactive moderate-frequency sputtering by using a target composed of an alloy of the metal cations, especially a target composed of a CoFeMnCr alloy, and using oxygen as reactive gas. The amount of oxygen added can be used here to vary the stoichiometry of the coating, and especially also set it to a substoichiometric value, i.e. with oxygen deficiency. Particular preference is given to using, for the target alloy, a composition range in % by weight of:

| | |
|---|---|
| Co | 15-25, especially 19-21, |
| Fe | 30-40, especially 34-36, |
| Mn | 14-24, especially 18-20, and |
| Cr | 21-31, especially 25-27. |

The molar ratio of the composition of the target also corresponds to the molar proportions of Co, Fe, Mn and Cr in the coating.

In a preferred embodiment, the separating element includes a glass or glass ceramic substrate and a coating for adjustment of the light transmittance, wherein the coating consists of one of the following material systems: spinels, cermets, carbides or carbonitrides.

In a preferred embodiment, the separating element has high transmission in the infrared spectral region. This enables the positioning of infrared-detecting sensors in the interior of the article of the invention or the use of radiation heating elements such as infrared sources. According to the sensor or heating element, transmission within a specific spectral region is important here.

The transmission values reported relate to the overall transmission of the sample or of the separating element, measured using an Ulbricht sphere. For this measurement, the sample is positioned between a suitable light source and an Ulbricht sphere at the inlet of the Ulbricht sphere. At an outlet of the Ulbricht sphere arranged laterally, at an angle of 90° to the beam path, is mounted a suitable sensor for detection of the transmitted light component. This measurement arrangement detects both the directly transmitted component and the scatteringly transmitted component of the light.

For silicon-based infrared sensors, as used, for example, in time-of-flight sensors for contactless input devices for gesture control or approach recognition, such as the VL6180X from ST Microelectronics, the spectral range between 850 and 1000 nm is of particular relevance. In this range, the separating element preferably has, at at least one wavelength, transmission of at least 3%, preferably at least 10%, more preferably at least 30%, in order to enable the use of such sensors. Particularly for gesture control, high transmissions are advantageous because gestures can then be detected at a greater distance from the outside of the separating element. Other applications for silicon-based infrared sensors are, for example, receivers for the signals from remote controllers or communication interfaces for optical data transfer.

InGaAs-based infrared detectors are sensitive particularly within the range between 1 and 2 µm. The separating element is suitable for the use of such detectors when it has, at at least one wavelength, preferably at a wavelength of 1600 nm, a transmission of at least 30%, preferably at least 45%, more preferably at least 60%.

The emission maximum of a radiation heating element is found from Wien's displacement law, and for temperatures between 100° C. and 1000° C. is between 7.8 µm and 2.3 µm. For reasons of energy efficiency and in order to prevent excess heating of the separating element by a radiation heating element, the separating element, in the range between 3.25 µm and 4.25 µm, at at least one wavelength, has a transmission of at least 10%, preferably at least 20%, more preferably at least 30%. In this spectral range, it is also possible to use bolometers or thermal columns disposed in the interior of the article to measure the temperature of a hot object in the exterior, for example a hot cooking vessel, when the transmission of the separating element meets the minimum demands specified.

In a preferred embodiment, the thickness of the glass or glass ceramic substrate is between 2 mm and 12 mm, preferably between 3 and 8 mm, more preferably between 3 and 6 mm. The thickness of the substrate is limited here essentially by the demands on mechanical stability and weight. Glasses thinner than 2 mm cannot be thermally tempered in practice for technical reasons since the cooling rates required for the purpose cannot be achieved at economically justifiable cost. In addition, it has to be noted that the thickness of the substrate can affect its optical properties. In each case, the thickness should be chosen so as to comply with the transmission limits mentioned.

The inventors have found that an additional advantageous effect occurs when the separating element is chosen such that the colour locus of D65 standard illuminant light, after passing through the separating element, i.e. even after passing through the glass or glass ceramic substrate, is within the abovementioned white region W1: surprisingly, such separating elements can achieve an improved dead front effect. This is achieved irrespective of whether the transmission of the separating element is established by addition of appropriate colouring components or via a coating.

The dead front effect is understood to mean the effect that electronic components disposed within an article of the invention, in the switched-off state, are invisible in the exterior, but that light which is emitted by inserted components such as lighting elements or optionally heating elements can pass through the separating element with sufficient brightness and hence can be perceived in the exterior. For this purpose, the separating element on the one hand has to have minimum transmission in order to prevent viewing of the components, but on the other hand has to have maximum transmission in order to attenuate the light emitted by components to a minimum degree.

This is particularly difficult to achieve, for example, in the case of the coloured glass ceramics for cooktops that are known in the prior art, since these, owing to the V2O5 used predominantly for colouring, have a very inhomogeneous transmission profile that, even in the case of optimized compositions, has very much higher transmission in the red spectral region than in the blue spectral region. But in order not to attenuate blue light, for example, from lighting elements in the interior of the cooktop too significantly, overall transmission must accordingly be chosen at a relatively high level, which in turn leads to very high transmission and hence a poor dead front effect in the red spectral region. For instance, in the case of a typical coloured glass ceramic known from the prior art with a light transmittance of 5.6%, the spectral transmittance in the blue spectral range of 450 to 500 nm is about 2.5-3%, whereas, in the red spectral range of 630 to 680 nm, it is between about 15% and 30%. The consequence of this is that both blue and red light can pass through the glass ceramic to a sufficient degree, but that there is no adequate dead front effect in the red spectral region since the components, in the switched-off state, at a spectral transmittance of 15% to 30%, can be perceived clearly, albeit only in red colour, in the exterior. Separating elements of the invention having a light transmittance of 2.6% may have, for example, a spectral transmittance of 2.7% at 470 nm and of 3.9% at 630 nm. What is achieved by this spectral profile is not just that D65 standard illuminant light after transmission is in the white region W1, but additionally that light of all wavelengths can pass sufficiently through the separating element but no such high transmittances occur in any spectral region that the dead front effect is adversely affected.

In other words, by comparison with the prior art, it is possible, for example, to achieve the advantages which follow. Given equal transmission in the blue spectral region, it is possible to choose lower light transmittance in the separating element and hence to achieve a better dead front effect overall. Alternatively, given equal light transmittance, it is possible to achieve higher transmission in the blue spectral region and hence better visibility of blue lighting elements, for example, and simultaneously a better dead front effect. As a further alternative, given a comparable dead front effect, it is possible to achieve higher like transmittance, which can be advantageous, for example, for the energy efficiency of the article of the invention.

The dead front effect can be determined by the measurement of a percentage grey value difference by the test method described hereinafter.

A grey value measurement device serves to determine percentage grey values, especially in order to be able to determine grey level differences between different regions. The measurement construction is within a dark chamber in order to be able to exclude outside light.

Four RAL cards are positioned within the dark chamber. The first RAL card has the RAL colour 9017 (traffic black) and the second RAL card has the RAL colour 7012 (basalt grey). These two RAL cards are not covered by the sample and serve for calibration. The third RAL card likewise has RAL colour 9017 (traffic black); the fourth RAL card has RAL colour 9003 (signal white). These two cards are completely covered by the sample and serve for measurement detection.

At a distance d of, for example, 606 millimetres is positioned a camera with a lens. Optionally, a filter may be mounted in front of the lens, for example a longpass filter or a tristimulus filter.

In the measurement device used, the following components are used: The camera takes the form of an acA1920—40 µm greyscale camera from Basler AG, and the lens takes the form of an LM35HC Megapixel from Kowa GmbH. No optional filter is used in front of the lens.

More particularly, the following camera settings are used, which are taken by the person skilled in the art concerned with the greyscale camera mentioned from the corresponding log file:

| | |
|---|---|
| Width | 1920 |
| Height | 1200 |
| OffsetX | 8 |
| OffsetY | 8 |
| CenterX | 0 |

-continued

| | |
|---|---|
| CenterY | 0 |
| BinningHorizontal | 1 |
| BinningVertical | 1 |
| ReverseX | 0 |
| ReverseY | 0 |
| PixelFormat | Mono8 |
| TestImageSelector | Off |
| GainAuto | Off |
| GainSelector | All |
| Gain | 0.00000 |
| GainSelector | All |
| BlackLevelSelector | All |
| BlackLevel | 0.00000 |
| BlackLevelSelector | All |
| Gamma | 1.00000 |
| RemoveParameterLimitSelector | Gain |
| RemoveParameterLimit | 0 |
| RemoveParameterLimitSelector | Gain |
| ExposureAuto | Off |
| ExposureMode | Timed |
| ExposureTime | 550000.0 |
| AcquisitionBurstFrameCount | 1 |
| TriggerSelector | FrameBurstStart |
| TriggerMode | Off |
| TriggerSelector | FrameStart |
| TriggerMode | Off |
| TriggerSelector | FrameStart |
| TriggerSelector | FrameBurstStart |
| TriggerSource | Line1 |
| TriggerSelector | FrameStart |
| TriggerSource | Line1 |
| TriggerSelector | FrameStart |
| TriggerSelector | FrameBurstStart |
| TriggerActivation | RisingEdge |
| TriggerSelector | FrameStart |
| TriggerActivation | RisingEdge |
| TriggerSelector | FrameStart |
| TriggerDelay | 0 |
| AcquisitionFrameRateEnable | 0 |
| AcquisitionFrameRate | 100.00000 |
| DeviceLinkSelector | 0 |
| DeviceLinkThroughputLimit | 360000000 |
| DeviceLinkSelector | 0 |
| DeviceLinkSelector | 0 |
| DeviceLinkThroughputLimitMode | On |
| DeviceLinkSelector | 0 |
| ChunkSelector | Gain |
| ChunkEnable | 0 |
| ChunkSelector | ExposureTime |
| ChunkEnable | 0 |
| ChunkSelector | Timestamp |
| ChunkEnable | 0 |
| ChunkSelector | LineStatusAll |
| ChunkEnable | 0 |
| ChunkSelector | CounterValue |
| ChunkEnable | 0 |
| ChunkSelector | PayloadCRC16 |
| ChunkEnable | 0 |
| ChunkSelector | Timestamp |
| ChunkModeActive | 0 |
| AutoTargetBrightness | 0.30196 |
| AutoFunctionProfile | MinimizeGain |
| AutoGainLowerLimit | 0.00000 |
| AutoGainUpperLimit | 36.00000 |
| AutoExposureTimeLowerLimit | 76.0 |
| AutoExposureTimeUpperLimit | 1000000.0 |

In the dark chamber, there are additionally LED spotlights from OSRAM Licht AG with colour temperature 4000 K, EAN: 4052899944282. The LED spotlights are adjusted such that there is a brightness of 1200 lux on the glass or glass ceramic substrate. In general, irrespective of the particular lighting means, provided that it has a typical domestic colour temperature and/or spectral intensity distribution, it is also possible to use another light source, for example a black-body source, especially a conventional halogen light source, provided that it has a brightness of about 1200 lux. This achieves a lighting situation typical of kitchens and laboratories. It should be pointed out that the measurements determined by means of the greyscale measurement device are essentially independent of brightness, and so other lighting may also be provided.

For the measurement, the lighting system is switched on and the dark chamber is closed. The camera is used to record a greyscale image of the situation. In other words, by means of the greyscale measurement device, a greyscale image is produced that depicts at least the following: the two RAL cards with RAL colours 9017 and 9003 viewed through the sample, the uncovered RAL card with RAL colour 9017 and the uncovered RAL card with RAL colour 7012.

Based on the greyscale image produced, the greyscale measurement device provides a measurement M1 corresponding to the RAL card with RAL colour 9017 viewed through the glass or glass ceramic substrate.

In addition, the greyscale measurement device provides a measurement M2 corresponding to the RAL card with RAL colour 9003 viewed through the glass or glass ceramic substrate.

Furthermore, the greyscale measurement device provides two further measurements corresponding to the two uncovered RAL cards for calibration.

In the greyscale measurement device used, the greyscale image is evaluated with the aid of the Halcon SDK Industry 12 image evaluation software from MVTec Software GmbH. It has been found that the measurement is independent of the lighting conditions and the brightness of lighting, provided that the image is not under- or overexposed. An evaluation routine in the software can be used to evaluate different measurement windows distributed over the image in respect of their greyscale levels. In each measurement window, the average of the grey values of all pixels can be measured across the measurement area including the standard deviation and recorded. In other words, the measurements M1, M2 and the measurements for the RAL cards can be formed as averages over measurement regions, where the measurement regions each have at least an area of 0.2 cm², preferably 0.9 cm².

Based on the absolute measurements M1, M2 and the measurements for the two RAL cards, each of which are absolute values, percentage greyscale levels G1 and G2 are calculated. In other words, relative contrasts are calculated in percent in order to make measurements comparable.

For this purpose, a linear function G is defined in that this linear function assigns a percentage grey value of 20% to the measurement corresponding to the RAL card with RAL colour 9017, and a percentage grey value of 90% to the measurement corresponding to the RAL card with RAL colour 7012. In other words, the measurements for the RAL cards 9017 are referenced as 20% and 7012 as 90%, which defines a linear conversion for all grey values measured.

The linear function G=G(M), which converts absolute measurements to percentage grey values, calculates the percentage grey values G1 and G2 as G1=G(M1) and G2=G(M2).

Optionally, further RAL cards may also additionally be provided in the dark chamber, for example with RAL colour 9006 (white aluminium) and/or RAL colour 7038 (agate grey).

The difference in the two percentage grey values measured, |G1–G2|, is a measure of the dead front effect. It has been found that values below 5.0% are barely perceptible by the human eye. In other words, a dead front effect is achieved. For an even better dead front effect, it is preferable when the grey level difference is less than 3.5%, more preferably less than 2.5% and especially preferably less than 1.5%. To determine these values, a statistical analysis was conducted with different observers.

The assessment of the dead front effect conducted in this measurement is particularly difficult to fulfil since the references used are a white colour card and a black colour card, which corresponds to the maximum possible contrast. Separating elements that fulfil this demand thus have an adequate dead front effect even for components that have strong contrasts in brightness on the side facing the separating element. These may be, for example, white or highly reflective electronic components on a dark, for example dark green, circuit board.

In a preferred embodiment, the article of the invention has a difference |G1–G2| between a percentage grey value G1 that corresponds to the measured grey value of a colour card of RAL colour 9017 viewed through the separating element and a percentage grey value G2 corresponding to the measured grey value of a colour card of RAL colour 9003 viewed through the separating element of less than 5.0%, preferably of less than 3.5%, more preferably of less than 2.5% and most preferably of less than 1.5%. Preferably, this grey value differential is achieved at a light transmittance of the separating element in the region of the cutout in the covering means of at least 2%, preferably at least 3%, more preferably at least 4%, most preferably at least 5%.

A further means of quantifying the dead front effect is to place the separating element without the covering means onto a black background and onto a white background, and to measure the colour locus in the CIELAB colour space for the two backgrounds as described above. The measurements can be used to calculate the maximum colour distance:

$$\Delta E = \sqrt{(L^*_{black} - L^*_{white})^2 + (a^*_{black} - a^*_{white})^2 + (b^*_{black} - b^*_{white})^2}$$

What is preferably achieved here is a colour difference of $\Delta E<10$, preferably <5, more preferably <1.

This value also depends on the light transmittance of the sample and increases with increasing light transmittance. In a preferred embodiment, the quotient of colour distance to light transmittance is less than 1.5, preferably less than 1, more preferably less than 0.8, for a light transmittance of more than 1%.

Yet another way of quantifying the dead front effect is to measure the spectral reflectivity $R1(\lambda)$ of the separating element against a white background, for example with RAL colour 9003, and spectral reflectivity $R2(\lambda)$ of the covering means in the spectral range of 400 to 700 nm of the separating element against a black background, for example with RAL colour 9017, for example by means of a PerkinElmer Lambda 850 UV/VIS spectrophotometer.

The two measured spectral reflectivities can be used to calculate, by the formula:

$$\rho_i = \frac{\int_{S_1}^{S_2} R_i(\lambda) d\lambda}{\int_{S_1}^{S_2} d\lambda}$$

with S1=400 nm and S2=700 nm, the reflectance $\varrho$ i (i=1,2). In a preferred embodiment, the difference in the reflectances $|\varrho 1-\varrho 2|$ is less than 3%, preferably less than 1.5%.

In a preferred embodiment, the glass or glass ceramic substrate, in the region of the lighting element, has a surface quality matched to the increase in the light quality. For example, the side facing the exterior of the article of the invention may be polished and hence have very low surface roughness, which advantageously minimizes the scatter of the light emitted by the display device at this surface. In this way, it is possible, for example, to achieve illuminated symbols or seven-segment displays with particularly high edge sharpness.

Alternatively, it may also be advantageous to structure the surface facing the exterior in a controlled manner, for example by means of rolling, etching or an anti-glare coating, in order to increase the proportion of scattered light. This may be advantageous to minimize reflections on the outside and hence enable better visibility of the light emitted by the lighting element, particularly in the case of light and directed ambient light with a small diffuse component.

In a further preferred embodiment, the glass or glass ceramic substrate is optimized at least in the region of the lighting element such that it causes minimum scatter for visible light. What this means is, for example, that the substrate has fewer than 3 bubbles per kg of glass or glass ceramic, preferably fewer than 2 bubbles per kg, more preferably less than 1 bubble per kg, based on a bubble size of at least 100 µm in diameter. Furthermore, it is advantageous when the substrate consists of glass ceramic having minimum intrinsic light scatter at the crystallites present. This is the case especially when the crystallites have an average size of less than 250 nm in diameter and the difference in refractive index between crystalline phase and residual glass phase is at a minimum. Both parameters can be greatly influenced by the choice of material composition and the ceramization conditions, especially the slope of the temperature ramps, duration of ceramization and maximum temperature during the ceramization. Preferably, glass ceramic substrates therefore have high quartz mixed crystals as the main crystal phase.

Preferably, the separating element in the visible spectral region has a haze of not more than 5%, preferably not more than 2%, more preferably not more than 1%. According to standard ASTM D1003, haze is understood to mean the proportion of light transmitted by a sample which is deflected by scatter by an angle of more than 2.5° relative to the optical axis of the light of the CIE-C illuminant incident on the sample. Haze can be measured, for example, with the BYK haze-gard instrument according to standard ASTM D1003. At a haze of not more than 5%, particularly good visibility of the display device is assured.

Alternatively or additionally, the separating element preferably has a clarity in the visible spectral region of at least 90%, preferably at least 95%, most preferably at least 98%. According to standard ASTM D1003, clarity is understood to mean the proportion of light transmitted by a sample which is deflected by scatter by an angle of not more than 2.5° relative to the optical axis of the light of the CIE-C illuminant incident on the sample. Clarity can be measured, for example, with the BYK haze-gard instrument according to standard ASTM D1003.

Working examples of transparent coloured glass ceramics suitable for use in articles of the invention and comparative examples are specified in Tables 1 to 4.

Tables 1 and 3 show the base compositions of crystallizable glasses and the properties thereof in the vitreous state, i.e. prior to ceramization.

Table 2 contains, in the "Dopants" field, the colour additions present in the respective starting glass and some selected properties of the resulting glass ceramics. All examples in Table 2 are based on the base composition of the glass in Table 1.

Table 4 contains some selected properties of the resulting glass ceramics. These are based on the base compositions of the glasses in Table 3.

Table 5 contains some selected properties of transparent uncoloured glass ceramics with molybdenum-silicon cermet coatings.

Table 1 shows a base composition for crystallizable glasses and the properties thereof. Apart from the colouring constituents, the base composition base glass 1 corresponds to the comparative glass 1 according to the prior art outside the invention. Table 1 also lists the following properties in the vitreous state: transformation temperature Tg [° C.], working temperature VA [° C.], $10^2$ temperature [° C.] and upper devitrification limit UDL [° C.]. For measurement of the UDL, the glasses are fused in Pt/Rh10 crucibles. Subsequently, the crucibles are kept at different temperatures in the region of the working temperature for 5 hours. The uppermost temperature at which the first crystals occur at the contact surface of the glass melt with the crucible wall determines the UDL.

Different contents of colouring compounds are added to the batch raw materials of this base composition, and new glasses are fused. By addition of the $MoO_3$ component, compositions of the invention are obtained. The glasses thus obtained in Table 2 have the base composition of glass 1 and differ merely in the colouring compounds specified and optionally reducing additives. They are crystallized by the ceramization programs listed in Table 2. The transmission properties of the glass ceramics obtained are listed. The main crystal phase measured by x-ray diffraction is also listed.

Examples 1 and 2 are comparative examples from the prior art (WO 2010/102859 A1), with a $V_2O_5$ content of 0.023% by weight, which were ceramized from glass 1 with different programs.

Inventive Examples 3 and 4 contain less than 0.015% by weight of $V_2O_5$. By comparison with the $V_2O_5$-free examples, Ex. 3 and 4 shift D65 standard illuminant light more strongly in the red direction, namely to x coordinates >0.4. By contrast with Comparative Examples 1 and 2, however, the value is still in the region of x<0.5. Light transmitted through the glass ceramic of Examples 3 and 4 at a thickness of 4 mm is within the white region W1, but is not within the white region W2 owing to the $V_2O_5$ content.

Likewise in the white region W1 but not in the white region W2 is Ex. 17 from Table 2, owing to the content of 0.02% by weight of CoO. In addition, Examples 19 and 20 are within the white region W2 but not within the white region W3.

Comparative glass ceramic 15 from Table 2 does not contain any $V_2O_5$, but is not within the white region W1 owing to the content of $Cr_2O_3$ of 0.02% by weight.

Table 3 shows the compositions of further crystallizable glasses and selected properties. Comparative glass 13, in terms of its composition, corresponds to the KeraVision® glass ceramic from EuroKera. The glass doped with Fe, V, Mn and Co, after transformation to the comparative glass ceramic 18 (Table 4), does not attain the low colour of the invention; more particularly, light transmitted through such a glass ceramic is no longer within the white region W1, and is therefore not suitable for use in an article of the invention.

Ceramization program 1 (ceramization time 96 min): a) heating within 23 minutes from room temperature to 680° C.; b) temperature increase from 680 to 800° C. within 19 min, involving heating at 10° C./min to 730° C., further heating at 5° C./min to 800° C.; c) temperature increase from 800° C. to 918° C. within 24 min and hold time of 10 min at maximum temperature; d) cooling down to 800° C. within 20 minutes, then rapid cooling to room temperature.

In ceramization program 2, the ceramization time has been shortened.

Ceramization program 2 (ceramization time 68 min): a) rapid heating from room temperature to 740° C. within 26 min, b) temperature increase from 740 to 825° C. within 18 min (heating rate 4.7° C./min), c) temperature increase from 825° C. to 930° C. in 4 min (heating rate 26° C./min), hold time of 4 min at maximum temperature, d) cooling down to 800° C. within 16 minutes, then rapid cooling to room temperature.

All examples have high quartz mixed crystal (HQMC) as the main crystal phase.

The thermal expansion of the glass ceramics with high quartz mixed crystal as main crystal phase is 0±0.5·10-6/K in the range of 20–700° C., i.e. meets the demands for thermally stable glass ceramics.

The transmission measurements were conducted on polished plates with the Perkin-Elmer Lambda 900 instrument. Transmission was determined on samples having a thickness of 3.5 to 4.1 mm and converted to a thickness of 4 mm. Spectral transmittances are reported for selected wavelengths. The measured spectral values in the range between 380 nm and 780 nm, which represents the visible light spectrum, are used to calculate the brightness L* and the colour coordinates a*, b* in the CIELAB colour system, and the brightness Y and colour coordinates x, y to DIN 5033 in the CIE colour system for the chosen standard illuminant and observer angle 2°. The brightness Y corresponds here to the light transmittance according to DIN EN 410. The chromaticity c* and the colour distance d of D65 standard illuminant light after transmission through a sample of thickness 4 mm relative to the original colour coordinates of D65 standard illuminant light (x=0.3127 and y=0.3290) are reported. This was calculated as follows:

$$d=\sqrt{(x-0.3127)^2+(y-0.3290)^2}.$$

The glass ceramics of the invention, i.e. those suitable for use as substrate in an article of the invention, have colour distances of about 0.03 to 0.14 and consequently shift transmitted light to a much lesser degree than the comparative examples.

The profile of the transmission curve in the range from 470 to 630 nm was used to calculate the flatness of the transmission (quotient of highest to lowest transmission in this range). The wavelengths for the maximum and minimum transmission are likewise reported. The values are reported for 4 mm-thick polished samples.

The scatter of the glass ceramics is determined by measuring haze. This involves measuring samples of thickness 3.5-4.1 mm that have been polished on both sides with a commercial "haze-gard plus" measuring instrument from BYK Gardner (standard ASTM D1003-13) with standard light C. Scatter is characterized by the haze value in the tables.

In addition, a visual assessment is conducted on the samples with a commercial white LED of the 7-segment display type (manufacturer: opto devices, model: OS39D3BWWA). The polished glass ceramic samples were placed onto the white LED at a distance of 1 mm and viewed from above at a distance of 31 cm over the entire angle range, i.e. perpendicularly to obliquely to the glass ceramic surface. Depending on the brightness of the glass ceramic sample, the luminance of the white LED at this distance at right angles to the glass ceramic plate is regulated to 60 cd/m², or, in the case of very dark glass ceramic samples Y<0.5%, operated at maximum power. In order to rule out the influence of outside light, the assessment is undertaken in a dark chamber with low ambient lighting of about 4 lux. For a cooktop, these conditions mean a very critical installation and lighting situation.

The visual assessments in the tables mean: 1=no scatter perceptible, 2=low but tolerable scatter, 3=visible scatter, requires additional work for the configuration of the cooktop, 4=distinctly visible scatter, intolerable. Ratings over and above stage 4 are impermissible, and those over and above stage 3 should preferably be avoided. None of the examples showed visually noticeable scatter in this test.

Examples B1 and B2 in Table 5 show two examples of MoSiOx cermet coatings on glass ceramic substrates. The substrate used for these layers was a 4 mm-thick uncoloured transparent LAS glass ceramic of the CERAN CLEARTRANS® type from SCHOTT AG.

These coatings are MoSiOx cermets with molybdenum (Mo) as metallic component in an SiOx matrix. The ratio of Mo to Si in % by weight in the coating for both is in the range from 10:90 Mo:Si to 50:50 Mo:Si. The two layers result in a black colour impression with a colour locus measured in reflectance in the region of 27<L*<30, −1<a*<1, −1<b*<1. The colour locus of D65 standard illuminant light after passing through the coatings and the substrate is within the white region W1 in each case. The brightness Y corresponding to the light transmittance is 2.6% or 2.9%. Both coatings have a flat transmission profile in the visible spectral region. In spite of the low transmission in the visible spectral region, the examples have high transmission in the infrared. Particularly at wavelengths >1500 nm, they have a transmission of more than 40.0%. They are thus suitable, for example, for use with a multitude of different optical sensors. Such sensors especially include the above-described detectors and sensors.

Both layers have a resistance of more than 20 Mohms. They are thus of very good suitability for use with capacitative and inductive sensors or induction heating elements.

BRIEF DESCRIPTION OF THE DRAWINGS

FIG. 1b shows an enlarged detail from FIG. 1a.

DETAILED DESCRIPTION

Figure 1A:
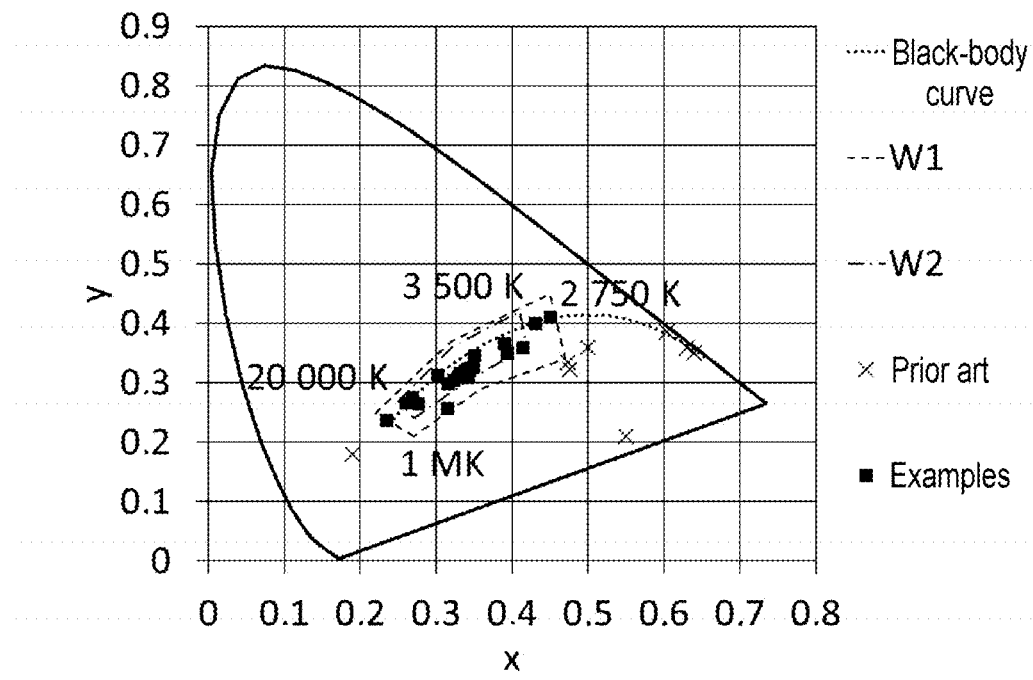
FIG. 1a shows a chromaticity diagram of the CIExyY colour space.
Figure 1B:
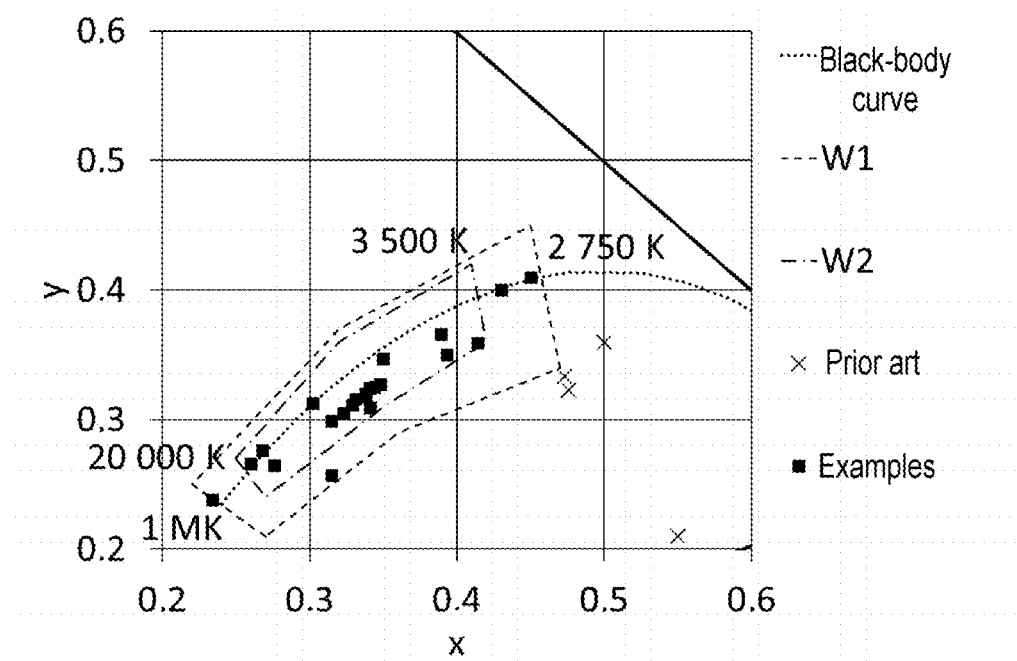

FIG. 1a shows a chromaticity diagram of the CIExyY colour space with 2° standard observer)(CIExyY-2°. FIG. 1b shows an enlarged detail from this diagram.

The figures depict the black-body curve as a dotted line, the two white regions W1 and W2 as dashed lines, the colour coordinates of the examples that are listed in Tables 2 and 4 and are suitable for use in an article of the invention as black squares, and examples from the prior art as black crosses.

Every point on the black-body curve corresponds to the colour locus of the light emitted by a black-body radiator at a defined temperature, called the colour temperature. This curve is of particular relevance to human perception since the sun likewise corresponds to a black-body radiator and hence the colour of sunlight is on the black-body curve.

According to the position of the sun, the colour locus moves between cooler and warmer colour loci; a colour temperature of 20 000 K corresponds to a clear sky and a temperature of 3500 K to evening sunlight shortly before the commencement of dusk. Colour loci at or close to the black-body curve are therefore perceived as white and particularly natural.

The prior art described consists partly of the glass ceramic types specified in WO 2012076414 A1 and partly of commercially available glass ceramics from SCHOTT AG and Eurokera. These examples from the prior art are all outside the white region W1. As known from WO 2012076414 A1, the white region W1 can be covered by these glass ceramics only through the use of additional, complex compensation filters. However, the inventive examples cover this region even without such a filter. All the colour loci shown relate to a material thickness of 4 mm.

The examples adopted from Tables 2 and 4 are all within the white region W1. Among these, all examples that contain less than 0.01% by weight of V2O5 in the glass ceramic, except for Example 17 which contains 0.02% by weight of CoO, are also within the white region W2. Therefore, the separating element preferably comprises glass ceramics that do not contain any V2O5 and CoO.

Figure 2:
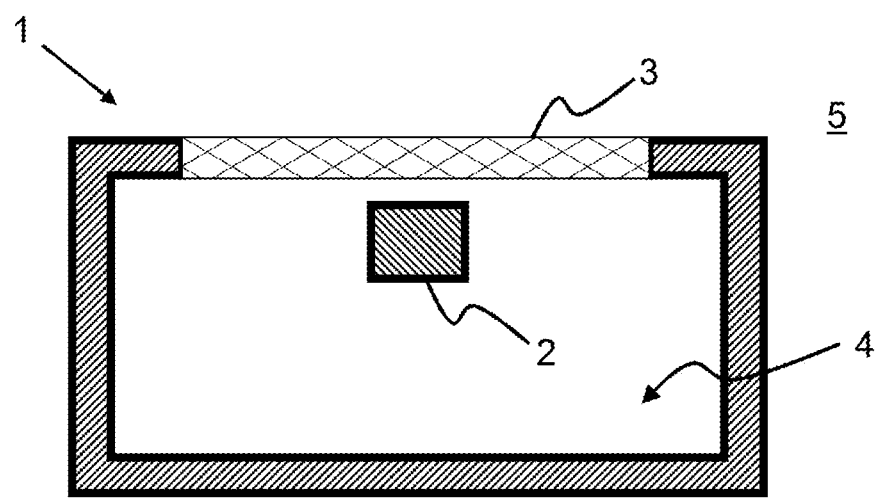
FIG. 2 is a schematic diagram of an embodiment of a fitout article or article of equipment of the disclosure in cross section.

FIG. 2 contains a schematic illustration of an article of the invention in cross section. The fitout article or article of equipment (1) shown for a kitchen or laboratory comprises a lighting element (2) and a separating element (3) that divides sections of an interior (4) of the article (1) from an exterior (5). The lighting element (2) is disposed in the interior (4) of the article (1) such that the light emitted by the lighting element (2) passes through a section of the separating element (3) and is perceptible by a user in the exterior (5) of the article (1). In the embodiment shown, the separating element (3) consists of a glass or glass ceramic substrate having a coefficient of thermal expansion CTE of 0 to 6×10−6/K in the temperature range between 20° C. and 300° C. In addition, the separating element (3) has a light transmittance of at least 0.1% and of less than 12% and a colour locus in the CIELAB colour space with the coordinates L* of 20 to 40, a* of −6 to 6 and b* of −6 to 6. The colour locus of D65 standard illuminant light after passing through the separating element (3) is within the white region W1.

Fitout articles or articles of equipment of the invention for kitchens or laboratories may also contain a multitude of further components in their interior in addition to the lighting element.

The articles may, for example, have one or more heating elements for heating an article, for example a pan, in the exterior or even in the interior of the article. These may especially be radiative heating elements, induction heating elements, gas heating elements or microwave generators.

The articles may additionally include display elements, such as LCD or OLED screens or video projectors, and other lighting elements such as point, linear or areal light sources. These include, for example, LEDs, optical fibres and OLEDs. These light sources can emit in a particular colour, especially white, red, green and/or blue, or else variable colours. Between these lighting elements and the separating element, it is possible for additional colour filters to be provided, for example in order to be able to utilize a white LED for production of a coloured lighting effect with a defined colour locus and high colour saturation.

Lighting elements may especially also be disposed in the hot region in the vicinity of heating elements. In this case, especially for the production of white lighting effects in the exterior of the article, it is advantageous that no temperature-sensitive black-body compensation filters are required.

The articles may have cooling aggregates, for example Peltier elements, in thermal contact with the separating element in order to produce a cooling surface, for example for cooling of foods or chemicals, on the exterior-facing side of the separating element.

The article may have various sensors, for example capacitative touch sensors for control or infrared sensors for gesture control or for measurement of the temperature of hot articles in the exterior, for example hot pans. In addition, the article may have microphones and cameras, for example for voice control or user recognition and authentication. This may be particularly advantageous in laboratories, for example, if the article may be used only by correspondingly trained personnel. Such sensors may have been printed, pressed, bonded or adhesive-bonded, or arranged in some other way, on the inside of the separating element. This is particularly true of touch sensors.

The article may have various interfaces for communication, for example WLAN, Bluetooth or NFC modules or infrared interfaces. By means of such interfaces, the article can be connected, for example, either to the Internet or to other articles in its vicinity, for example pans with a corresponding interface or other electronic devices. More particularly, for control and communication, it can be connected to a mobile electronic device, such as a mobile phone or a tablet.

The article may contain a device for wireless energy transmission from articles in the exterior, especially by means of induction coils and in accordance with the Qi standard.

The separating element may have coatings on the exterior-facing side, for example anti-scratch layers, anti-reflection layers, anti-glare layers, decorative layers, easily cleanable layers or infrared-reflecting layers, provided that these do not alter the essential optical properties of the separating element.

The separating element may have cutouts, for example recesses for sinks or down-draft fume hoods or bushings for pipelines.

Likewise optionally, the separating element may have edge elaboration, for example a facet or a pencil finish.

All these constituents may be present individually or in combination.

TABLE 1

COMPOSITION AND PROPERTIES OF THE CRYSTALLIZABLE BASE GLASS 1 WITH BASE COMPOSITION

| Composition | % by wt. | Glass No. 1 |
|---|---|---|
| $Li_2O$ | | 3.80 |
| $Na_2O$ | | 0.60 |
| $K_2O$ | | 0.25 |
| MgO | | 0.29 |
| CaO | | 0.40 |
| SrO | | 0.02 |
| BaO | | 2.23 |
| ZnO | | 1.53 |
| $Al_2O_3$ | | 20.9 |
| $SiO_2$ | | 65.0 |
| $TiO_2$ | | 3.10 |
| $ZrO_2$ | | 1.38 |
| $P_2O_5$ | | 0.09 |
| $SnO_2$ | | 0.25 |
| $As_2O_3$ | | 0 |
| $MnO_2$ | | 0.025 |

TABLE 1-continued

COMPOSITION AND PROPERTIES OF THE CRYSTALLIZABLE BASE GLASS 1 WITH BASE COMPOSITION

| Composition | % by wt. | Glass No. 1 |
|---|---|---|
| $H_2O$ content (β-OH) | $mm^{-1}$ | 0.39 |
| Properties in glass form | | |
| Transformation temperature $T_g$ | °C. | 662 |
| $10^2$ temperature | °C. | 1742 |
| Working temperature $V_A$ | °C. | 1306 |
| UDL temperature | °C. | 1260 |

TABLE 2

DOPANTS AND PROPERTIES OF THE INVENTIVE GLASS CERAMICS AND COMPARATIVE GLASS CERAMICS 1 AND 2

| Example No. | | 1 | 2 | 3 | 4 | 5 |
|---|---|---|---|---|---|---|
| Glass No. | | 1 | 1 | 2 | 3 | 4 |
| Base glass | | 1 | 1 | 1 | 1 | 1 |
| Dopants (% by wt.) | | | | | | |
| $Fe_2O_3$ | | 0.090 | 0.090 | 0.120 | 0.088 | 0.088 |
| $V_2O_5$ | | 0.023 | 0.023 | 0.010 | 0.013 | |
| $MoO_3$ | | | | 0.057 | 0.046 | 0.170 |
| $MnO_2$ | | 0.025 | 0.025 | 0.025 | 0.025 | 0.025 |
| $Cr_2O_3$ | | | | | | |
| $CeO_2$ | | | | | | |
| $WO_3$ | | | | | | |
| Addition to batch | | | | | | |
| Ceramization | # | 1 | 2 | 1 | 1 | 1 |
| Properties in ceramized form | | | | | | |
| Transmission, thickness 4 mm, D65 standard light, 2° | | | | | | |
| 470 nm | % | 1.2 | 0.7 | 2.9 | 2.4 | 2.7 |
| 630 nm | % | 9.9 | 6.6 | 12.6 | 9.5 | 3.9 |
| 950 nm | % | 73.0 | 71.9 | 66.5 | 67.7 | 45.0 |
| 1600 nm | % | 76.4 | 76.3 | 70.9 | 75.7 | 70.3 |
| 3700 nm | % | 52.0 | 51.1 | 50.0 | 53.2 | 50.4 |
| Colour coordinates (CIExyY) in transmission | | | | | | |
| x | | 0.502 | 0.517 | 0.447 | 0.436 | 0.348 |
| y | | 0.367 | 0.358 | 0.365 | 0.351 | 0.327 |
| Brightness Y | % | 3.6 | 2.2 | 5.8 | 4.4 | 2.6 |
| Colour distance d | | 0.193 | 0.207 | 0.139 | 0.125 | 0.035 |
| Colour coordinates (CIELab) in reflectance | | | | | | |
| L* | | 25.19 | 24.99 | 25.74 | 25.54 | 25.37 |
| a* | | 0.28 | 0.04 | 0.39 | 0.47 | -0.13 |
| b* | | -0.66 | -0.78 | 0.80 | -0.54 | -1.05 |
| c* | | 0.72 | 0.78 | 0.89 | 0.72 | 1.06 |
| ΔE | | 4.26 | 0.68 | 5.58 | 6.54 | 0.29 |
| ΔG | % | | | 16.9 | 8.1 | 0.9 |
| Flatness | nm | 8.4 | 10.0 | 4.4 | 4.0 | 1.7 |
| transmission (wavelength at max./min.) | | 630/470 | 630/470 | 630/470 | 630/470 | 630/538 |
| Scatter, thickness 4 mm, D65 standard light, 2° | | | | | | |
| Visual assessment | | 1 | 1 | 1 | 1 | 1 |
| Haze | % | 0.8 | 0.5 | 1.5 | 1.5 | 1.1 |
| X-ray diffraction | | | | | | |
| Main crystal phase | | HQMC | HQMC | HQMC | HQMC | HQMC |
| Thermal expansion $[10^{-6}/K]$ | | | | | | |
| CTE $\alpha_{20/300}$ | | -0.26 | -0.29 | | | |
| CTE $\alpha_{20/700}$ | | 0.13 | 0.17 | | | |

DOPANTS AND PROPERTIES OF INVENTIVE GLASS CERAMICS.

| Example No. | | 6 | 7 | 8 | 9 |
|---|---|---|---|---|---|
| Glass No. | | 5 | 5 | 6 | 6 |
| Base glass | | 1 | 1 | 1 | 1 |
| Dopants (% by wt.) | | | | | |
| $Fe_2O_3$ | | 0.088 | 0.088 | 0.062 | 0.062 |
| $V_2O_5$ | | | | | |
| $MoO_3$ | | 0.170 | 0.170 | 0.150 | 0.150 |
| $MnO_2$ | | 0.025 | 0.025 | 0.025 | 0.025 |
| $Cr_2O_3$ | | | | | |
| $CeO_2$ | | | | | |
| $WO_3$ | | | | | |
| Addition to batch | | 50% shards | 50% shards | | |
| Ceramization | # | 1 | 2 | 1 | 2 |
| Properties in ceramized form | | | | | |
| Transmission, thickness 4 mm, D65 standard light, 2° | | | | | |
| 470 nm | % | 2.3 | 2.0 | 1.2 | 1.5 |
| 630 nm | % | 3.9 | 2.3 | 1.9 | 1.6 |
| 950 nm | % | 41.5 | 35.3 | 36.7 | 34.2 |
| 1600 nm | % | 69.8 | 68.5 | 71.5 | 70.9 |
| 3700 nm | % | 51.8 | 52.0 | 52.4 | 52.4 |
| Colour coordinates (CIExyY) in transmission | | | | | |
| x | | 0.338 | 0.329 | 0.323 | 0.315 |
| y | | 0.318 | 0.311 | 0.305 | 0.299 |
| Brightness Y | % | 2.0 | 1.6 | 1.4 | 1.2 |
| Colour distance d | | 0.028 | 0.024 | 0.026 | 0.030 |
| Colour coordinates (CIELab) in reflectance | | | | | |
| L* | | | 24.99 | 25.91 | 24.98 |
| a* | | | -0.03 | 0.03 | -0.02 |
| b* | | | -0.77 | -0.79 | -0.78 |
| c* | | | 0.77 | 0.79 | 0.78 |
| ΔE | | | 0.06 | 0.06 | 0.03 |
| ΔG | % | 0.7 | 0.4 | 0.7 | 0.5 |
| Flatness | nm | 2.2 | 1.6 | 1.6 | 1.5 |
| transmission (wavelength at max./min.) | | 630/545 | 630/552 | 630/553 | 630/558 |
| Scatter, thickness 4 mm, D65 standard light, 2° | | | | | |
| Visual assessment | | 1 | 1 | 1 | 1 |
| Haze | % | 0.4 | 2.3 | 0.5 | 3.1 |
| X-ray diffraction | | | | | |
| Main crystal phase | | HQMC | HQMC | HQMC | HQMC |

DOPANTS AND PROPERTIES OF INVENTIVE GLASS CERAMICS.

| Example No. | | 10 | 11 | 12 | 13 | 14 |
|---|---|---|---|---|---|---|
| Glass No. | | 7 | 7 | 8 | 9 | 9 |
| Base glass | | 1 | 1 | 1 | 1 | 1 |
| Dopants (% by wt.) | | | | | | |
| $Fe_2O_3$ | | 0.062 | 0.062 | 0.061 | 0.062 | 0.062 |
| $V_2O_5$ | | | | | | |
| $MoO_3$ | | 0.150 | 0.150 | 0.150 | 0.040 | 0.040 |
| $MnO_2$ | | 0.023 | 0.023 | 0.023 | 0.025 | 0.025 |
| $CeO_2$ | | 0.060 | 0.060 | | | |
| $WO_3$ | | | | 0.050 | | |
| Addition to batch | | | | | 0.2% sugar without nitrate | 0.2% sugar without nitrate |
| Ceramization | # | 1 | 2 | 1 | 1 | 2 |
| Properties in ceramized form | | | | | | |
| Transmission, thickness 4 mm, D65 standard light, 2° | | | | | | |
| 470 nm | % | 2.6 | 2.3 | 2.4 | 4.8 | 4.2 |
| 630 nm | % | 3.4 | 2.8 | 2.9 | 2.8 | 2.2 |
| 950 nm | % | 44.5 | 41.8 | 41.6 | 32.1 | 28.9 |
| 1600 nm | % | 73.7 | 73.1 | 73.3 | 75.7 | 74.7 |
| 3700 nm | % | 52.0 | 51.8 | 51.9 | 50.6 | 50.5 |
| Colour coordinates (CIExyY) in transmission | | | | | | |
| x | | 0.341 | 0.331 | 0.329 | 0.268 | 0.260 |
| y | | 0.324 | 0.316 | 0.311 | 0.276 | 0.266 |
| Brightness Y | % | 2.4 | 2.0 | 2.1 | 3.0 | 2.5 |
| Colour distance d | | 0.028 | 0.023 | 0.024 | 0.069 | 0.082 |

TABLE 2-continued

| Colour coordinates (CIELab) in reflectance | | | | | | |
|---|---|---|---|---|---|---|
| L* | | 25.94 | 25.06 | 25.97 | 25.92 | 25.12 |
| a* | | −0.03 | −0.02 | −0.05 | −0.02 | 0.01 |
| b* | | −0.76 | −0.76 | −0.76 | −0.89 | −0.93 |
| c* | | 0.76 | 0.76 | 0.76 | 0.89 | 0.93 |
| ΔE | | 0.12 | 0.1 | 0.09 | 0.24 | 2.11 |
| ΔG | % | 1.0 | 0.7 | 0.9 | 1.3 | 0.8 |
| Flatness | nm | 1.6 | 1.6 | 1.6 | 1.8 | 2.0 |
| transmission (wavelength at max./min.) | | 630/542 | 630/549 | 630/545 | 470/594 | 470/601 |
| Scatter, thickness 4 mm, D65 standard light, 2° | | | | | | |
| Visual assessment | | 1 | 1 | 1 | 1 | 1 |
| Haze | % | 0.5 | 1.0 | 1.0 | 0.8 | 2.1 |
| X-ray diffraction | | | | | | |
| Main crystal phase | | HQMC | HQMC | HQMC | HQMC | HQMC |
| Thermal expansion [10$^{-6}$/K] | | | | | | |
| CTE α$_{20/300}$ | | −0.21 | −0.27 | −0.25 | −0.27 | −0.32 |
| CTE α$_{20/700}$ | | 0.17 | 0.11 | 0.15 | 0.14 | 0.09 |

DOPANTS AND PROPERTIES OF INVENTIVE GLASS CERAMICS AND COMPARATIVE GLASS CERAMIC 15.

| Example No. | 15 | 16 | 17 |
|---|---|---|---|
| Glass No. | 10 | 11 | 12 |
| Base glass | 1 | 1 | 1 |
| Dopants (% by wt.) | | | |
| Fe$_2$O$_3$ | 0.062 | 0.062 | 0.061 |
| V$_2$O$_5$ | | | |
| MoO$_3$ | 0.150 | 0.150 | 0.150 |
| MnO$_2$ | 0.025 | 0.025 | 0.025 |
| CoO | | | 0.020 |
| Cr$_2$O$_3$ | 0.020 | | |
| Nd$_2$O$_3$ | | | |
| NiO | | 0.027 | |
| Addition to batch | | | |
| Ceramization | # | 1 | 1 | 1 |
| Properties in ceramized form | | | |
| Transmission, thickness 4 mm, D65 standard light, 2° | | | |
| 470 nm | % | 0.3 | 1.6 | 2.0 |
| 630 nm | % | 2.6 | 2.1 | 2.0 |
| 950 nm | % | 43.5 | 36.6 | 39.7 |
| 1600 nm | % | 73.1 | 63.8 | 66.7 |
| 3700 nm | % | 51.9 | 50.8 | 50.4 |
| Colour coordinates (CIExyY) in transmission | | | |
| x | | 0.475 | 0.341 | 0.315 |
| y | | 0.452 | 0.309 | 0.257 |
| Brightness Y | % | 1.5 | 1.3 | 1.2 |
| Colour distance d | | 0.204 | 0.035 | 0.072 |
| Colour coordinates (CIELab) in reflectance | | | |
| L* | | | | |
| a* | | | | |
| b* | | | | |
| c* | | | | |
| ΔE | | | | |
| ΔG | % | | | |
| Flatness | nm | 7.8 | 2.0 | 2.4 |
| transmission (wavelength at max./min.) | | 630/470 | 630/538 | 630/546 |
| Scatter, thickness 4 mm, D65 standard light, 2° | | | |
| Visual assessment | | 1 | 1 | 1 |
| X-ray diffraction | | | | |
| Main crystal phase | | HQMC | HQMC | HQMC |
| Thermal expansion [10$^{-6}$/K] | | | |
| CTE α$_{20/300}$ | | | −0.23 | −0.23 |
| CTE α$_{20/700}$ | | | 0.17 | 0.15 |

TABLE 3

COMPOSITIONS AND PROPERTIES OF CRYSTALLIZABLE GLASSES AND COMPARATIVE GLASS NO. 13

| Glass No. | 13 | 14 | 15 | 16 | 17 |
|---|---|---|---|---|---|
| Composition (% by wt.) | | | | | |
| Li$_2$O | 3.83 | 3.71 | 4.03 | 3.31 | 3.82 |
| Na$_2$O | 0.57 | 0.46 | 0.42 | 0.37 | 0.60 |
| K$_2$O | 0.21 | 0.14 | 0.40 | 0.36 | 0.27 |
| MgO | 0.19 | 0.98 | 0.77 | 0.56 | 0.30 |
| CaO | 0.36 | | | 0.58 | 0.43 |
| SrO | | | | | 0.02 |
| BaO | 2.41 | | 0.39 | 1.62 | 2.22 |
| ZnO | 1.41 | 1.58 | 0.56 | 1.92 | 1.52 |
| Al$_2$O$_3$ | 20.2 | 20.9 | 20.1 | 21.4 | 20.9 |
| SiO$_2$ | 65.8 | 67.5 | 68.0 | 64.8 | 64.8 |
| TiO$_2$ | 3.02 | 2.47 | 4.69 | 3.20 | 4.10 |
| ZrO$_2$ | 1.39 | 1.69 | | 1.35 | 0.43 |
| P$_2$O$_5$ | 0.11 | 0.09 | 0.11 | 0.04 | 0.10 |
| SnO$_2$ | 0.30 | 0.23 | 0.24 | 0.24 | 0.25 |
| As$_2$O$_3$ | | | | | |
| Fe$_2$O$_3$ | 0.090 | 0.060 | 0.062 | 0.099 | 0.061 |
| V$_2$O$_5$ | 0.016 | | | | |
| MoO$_3$ | | | 0.150 | 0.140 | 0.160 | 0.150 |
| MnO$_2$ | 0.021 | 0.024 | | | 0.024 |
| CoO | 0.027 | | | | |
| Addition to batch | | | | | |

TABLE 3-continued

COMPOSITIONS AND PROPERTIES OF CRYSTALLIZABLE
GLASSES AND COMPARATIVE GLASS NO. 13

Properties in glass form

| | | | | |
|---|---|---|---|---|
| Transformation temperature $T_g$ | °C. | 674 | 675 | 667 |
| $10^2$ temperature | °C. | 1729 | 1733 | |
| Working temperature $V_A$ | °C. | 1310 | 1300 | 1294 |
| UDL temperature | °C. | 1280 | 1275 | |

COMPOSITIONS AND PROPERTIES OF CRYSTALLIZABLE GLASSES

| Glass No. | 18 | 19 | 20 | 21 |
|---|---|---|---|---|
| Composition (% by wt.) | | | | |
| $Li_2O$ | 2.67 | 3.67 | 3.73 | 3.82 |
| $Na_2O$ | 0.54 | 0.77 | 0.78 | 0.60 |
| $K_2O$ | 0.24 | 0.21 | 0.58 | 0.26 |
| MgO | 1.73 | 0.77 | 0.20 | 0.30 |
| CaO | 0.69 | 0.21 | 0.21 | 0.43 |
| SrO | | | | 0.02 |
| BaO | 1.97 | 0.68 | 2.41 | 2.23 |
| ZnO | 1.65 | 0.90 | 0.93 | 1.48 |
| $Al_2O_3$ | 20.0 | 22.2 | 20.0 | 21 |
| $SiO_2$ | 64.9 | 65.4 | 66.4 | 64.5 |
| $TiO_2$ | 5.04 | 4.26 | 2.83 | 3.08 |
| $ZrO_2$ | | 0.54 | 1.40 | 1.40 |
| $P_2O_5$ | 0.07 | | | 0.56 |
| $SnO_2$ | 0.24 | 0.19 | 0.39 | 0.23 |
| $As_2O_3$ | | | | |
| $Fe_2O_3$ | 0.091 | 0.085 | 0.033 | 0.062 |
| $V_2O_5$ | | | | |
| $MoO_3$ | 0.099 | 0.079 | 0.045 | 0.040 |
| $MnO_2$ | 0.018 | | | 0.025 |
| CoO | | | | |
| Addition to batch | | 0.1% sugar without nitrate | 0.2% sugar without nitrate | 0.07% S |

Properties in glass form

| | | | | |
|---|---|---|---|---|
| Transformation temperature $T_g$ | °C. | 671 | | 668 |
| $10^2$ temperature | °C. | | | |
| Working temperature $V_A$ | °C. | 1296 | | 1299 |
| UDL temperature | °C. | 1265 | | |

TABLE 4

PROPERTIES OF INVENTIVE GLASS CERAMICS AND
COMPARATIVE GLASS CERAMIC OF EXAMPLE 18.

| Example No. | 18 | 19 | 20 | 21 | 22 |
|---|---|---|---|---|---|
| Glass No. | 13 | 14 | 15 | 16 | 16 |
| Ceramization # | 2 | 2 | 1 | 1 | 2 |

Properties in ceramized form
Transmission, thickness 4 mm, D65 standard light, 2°

| | | | | | |
|---|---|---|---|---|---|
| 470 nm % | 1.9 | 2.5 | 0.8 | 5.8 | 5.2 |
| 630 nm % | 10.8 | 7.8 | 1.7 | 8.3 | 7.0 |
| 950 nm % | 72.0 | 55.4 | 37.6 | 53.4 | 50.9 |
| 1600 nm % | 67.5 | 70.8 | 73.5 | 69.1 | 68.1 |
| 3700 nm % | 49.4 | 49.9 | 52.4 | 46.3 | 46.4 |

Colour coordinates (CIExyY) in transmission

| | | | | | | |
|---|---|---|---|---|---|---|
| x | | 0.476 | 0.414 | 0.393 | 0.344 | 0.338 |
| y | | 0.322 | 0.359 | 0.350 | 0.325 | 0.320 |
| Brightness Y | % | 3.5 | 4.2 | 1.0 | 5.9 | 5.0 |
| Colour distance d | | 0.163 | 0.106 | 0.083 | 0.032 | 0.027 |

Colour coordinates (CIELab) in reflectance

| | | | | | | |
|---|---|---|---|---|---|---|
| L* | | | | | | |
| a* | | | | | | |
| b* | | | | | | |
| c* | | | | | | |
| ΔE | | | | | | |
| ΔG | % | | | | | 3.3 |
| Flatness transmission (wavelength at max./min.) | nm | 8.0 630/504 | 3.1 630/470 | 2.3 630/509 | 1.6 630/527 | 1.6 630/536 |

TABLE 4-continued

Scatter, thickness 4 mm, D65 standard light, 2°

| | | | | | |
|---|---|---|---|---|---|
| Visual assessment | | 1 | 1 | 1 | 1 | 1 |
| Haze | % | | | | 0.6 | 3.4 |

X-ray diffraction

| Main crystal phase | HQMC | HQMC | HQMC | HQMC | HQMC |
|---|---|---|---|---|---|

Thermal expansion [$10^{-6}$/K]

| CTE $\alpha_{20/300}$ | −0.4 | −0.45 | −0.14 | 0.05 | 0.00 |
|---|---|---|---|---|---|
| CTE $\alpha_{20/700}$ | 0.03 | −0.15 | 0.14 | 0.34 | 0.27 |

CONTINUATION OF TABLE 4:
PROPERTIES OF INVENTIVE GLASS CERAMICS.

| Example No. | 23 | 24 | 25 | 26 | 27 |
|---|---|---|---|---|---|
| Glass No. | 17 | 18 | 19 | 20 | 21 |
| Ceramization # | 1 | 1 | 2 | 2 | 1 |

Properties in ceramized form
Transmission, thickness 4 mm

| | | | | | |
|---|---|---|---|---|---|
| 470 nm % | 0.9 | 0.7 | 1.9 | 12.5 | 1.8 |
| 630 nm % | 0.6 | 1.4 | 2.8 | 10.8 | 0.6 |
| 950 nm % | 25.6 | 34.6 | 33.1 | 51.8 | 18.6 |
| 1600 nm % | 73.5 | 71.3 | 69.9 | 82.7 | 73.2 |
| 3700 nm % | 51.5 | 44.3 | 47.7 | 47.0 | 49.2 |

Colour coordinates (CIE) in transmission

| x | | 0.276 | 0.389 | 0.350 | 0.302 | 0.234 |
|---|---|---|---|---|---|---|
| y | | 0.265 | 0.366 | 0.347 | 0.313 | 0.238 |
| Brightness Y | % | 0.5 | 0.9 | 2.1 | 10.3 | 0.9 |
| Colour distance d | | 0.089 | 0.085 | 0.041 | 0.019 | 0.120 |
| Flatness transmission (wavelength at max./min.) | nm | 2.1 470/571 | 2.1 630/470 | 1.5 630/470 | 1.3 470/575 | 2.9 470/609 |

Scatter, thickness 4 mm, D65 standard light, 2°

| Visual assessment | | 1 | 1 | 1 | 1 | 1 |
|---|---|---|---|---|---|---|
| Haze | % | 3.3 | 2.5 | 2.9 | 1.1 | 0.2 |

X-ray diffraction

| Main crystal phase | HQMC | HQMC | HQMC | HQMC | HQMC |
|---|---|---|---|---|---|

Thermal expansion [$10^{-6}$/K]

| CTE $\alpha_{20/300}$ | −0.13 | 1.23 | 0.23 | −0.14 | −0.28 |
|---|---|---|---|---|---|
| CTE $\alpha_{20/700}$ | 0.23 | 1.49 | 0.51 | 0.26 | 0.12 |

TABLE 5

PROPERTIES OF COATED UNCOLOURED GLASS CERAMICS

| Example No. | B1 | B2 |
|---|---|---|
| Type | Cermet | Cermet |
| Material | MoSiOx | MoSiOx |
| Mo | 43 | 14 |
| Si | 57 | 86 |
| Colour | black | black |

Colour locus

| L* | 29.0 | 27.4 |
|---|---|---|
| a* | −0.1 | 0.3 |
| b* | 0.8 | 0.1 |
| x | 0.43 | 0.45 |
| y | 0.40 | 0.41 |
| Brightness Y | 2.6 | 2.9 |

Transmission

| 470 nm [%] | 1.1 | 1.0 |
|---|---|---|
| 630 nm [%] | 4.4 | 5.2 |
| 950 nm [%] | 13.8 | 20.1 |
| 1600 nm [%] | 40.5 | 51.4 |
| 3750 nm [%] | 40.2 | 40.9 |
| Haze [%] | 0.3 | 0.3 |
| Flatness of transmission | 4.0 630/470 | 5.2 630/470 |

Other properties

| R [MΩ/□] | >20 | >20 |
|---|---|---|

What is claimed is:

1. A fitout article or article of equipment for a kitchen or laboratory, comprising:
   an interior;
   a separating element separating the interior from an exterior; and
   a lighting element in the interior such that light emitted by the lighting element passes through the separating element to the exterior,
   wherein the separating element comprises a glass or glass ceramic substrate having a coefficient of thermal expansion of −0.45 to 6 ppm/K in a temperature range between 20° C. and 300° C. and a light transmittance of at least 0.1% and less than 12%,
   wherein the separating element has a colour locus in a CIELAB colour space with coordinates L* of 20 to 40, a* of −6 to 6 and b* of −6 to 6, measured in reflectance with D65 standard illuminant light against a black trap, and
   wherein the separating element has a colour locus of D65 standard illuminant light, after passing through the separating element, within a white region W1 determined in a chromaticity diagram CIExyY-2° by coordinates:

| White region W1 | |
|---|---|
| x | y |
| 0.27 | 0.21 |
| 0.22 | 0.25 |
| 0.32 | 0.37 |
| 0.45 | 0.45 |
| 0.47 | 0.34 |
| 0.36 | 0.29. |

2. The fitout article or article of equipment of claim 1, further comprising no black-body compensation filter.

3. The fitout article or article of equipment of claim 1, wherein the light transmittance of the separating element is at least 2% and less than 9%.

4. The fitout article or article of equipment of claim 1, wherein the separating element has a transmission at a wavelength of 1600 nm of at least 30%.

5. The fitout article or article of equipment of claim 1, wherein the separating element has a transmission at at least one wavelength in a range between 900 nm and 1000 nm of at least 3%.

6. The fitout article or article of equipment of claim 1, wherein the separating element has a transmission at at least one wavelength in a range between 3.25 µm and 4.25 µm of at least 10%.

7. The fitout article or article of equipment of claim 1, wherein the glass or glass ceramic substrate is a glass ceramic substrate, the coefficient of thermal expansion of the glass ceramic substrate between 20 and 300° C. is −0.45 to 2.5×10−6/K.

8. The fitout article or article of equipment of claim 1, wherein the glass or glass ceramic substrate is a glass substrate, the coefficient of thermal expansion of the glass substrate between 20 and 300° C. is 3.5 to 6×10−6/K, and the glass substrate having a glass transition temperature of 500 to 650° C.

9. The fitout article or article of equipment of claim 1, wherein the colour locus in the CIELAB colour space has the coordinates 22≤L*≤35, with −4≤a*≤4, and with −4≤b*≤4.

10. The fitout article or article of equipment of claim 1, wherein the separating element comprises a coating for adjustment of the light transmittance, wherein the coating comprises a material system selected from a group consisting of: spinels, cermets, carbides, and carbonitrides.

11. The fitout article or article of equipment of claim 1, wherein the glass or glass ceramic substrate is a glass ceramic substrate comprising a material selected from a group consisting of: 0.003-0.25% by weight of MoO3, less than 0.2% by weight of Nd2O3, and any combinations thereof.

12. The fitout article or article of equipment of claim 1, further comprising a difference between a percentage grey value that corresponds to a measured grey value of a colour card of RAL colour 9017 viewed through the separating element and a percentage grey value corresponding to a measured grey value of a colour card of RAL colour 9003 viewed through the separating element, wherein the difference is less than 5.0%.

13. The fitout article or article of equipment of claim 1, wherein the separating element has a haze of at most 5%.

14. The fitout article or article of equipment of claim 1, wherein the separating element has a clarity of at least 90%.

15. The fitout article or article of equipment of claim 1, wherein the lighting element has at least two intensity maxima in a visible spectral region.

16. The fitout article or article of equipment of claim 1, wherein the lighting element is an LED.

17. The fitout article or article of equipment of claim 1, wherein the lighting element is a seven-segment display.

18. The fitout article or article of equipment of claim 1, wherein the fitout article or article of equipment is configured for a use selected from a group consisting of: a cooking table, a laboratory table, a kitchen cabinet, a cooking appliance, a baking oven, a microwave device, a refrigerator, a grill, a steam cooker, a toaster, and an extractor hood.

19. The fitout article or article of equipment of claim 1, wherein the separating element is configured for a use selected from the group consisting of: a cooking table surface, a laboratory table surface, a kitchen working surface, a cooktop, a baking oven door, a microwave oven door, an item of furniture, a front of a door, and a front of a drawer.

* * * * *